US012763345B2

(12) United States Patent
Berry

(10) Patent No.: US 12,763,345 B2
(45) Date of Patent: Oct. 13, 2026

(54) PEM FUEL CELL STACK

(71) Applicant: KINGSBERRY FUEL CELL POWER, INC., Flint, MI (US)

(72) Inventor: Kingsley Joel Berry, Flint, MI (US)

(73) Assignee: KINGSBERRY FUEL CELL POWER, INC., Flint, MI (US)

( * ) Notice: Subject to any disclaimer, the term of this patent is extended or adjusted under 35 U.S.C. 154(b) by 0 days.

(21) Appl. No.: 19/347,351

(22) Filed: Oct. 1, 2025

(65) Prior Publication Data

US 2026/0094850 A1 Apr. 2, 2026

Related U.S. Application Data

(60) Provisional application No. 63/701,859, filed on Oct. 1, 2024.

(51) Int. Cl.

| | |
|---|---|
| ***H01M 8/04007*** | (2016.01) |
| ***H01M 8/04029*** | (2016.01) |
| ***H01M 8/0438*** | (2016.01) |
| ***H01M 8/04701*** | (2016.01) |
| ***H01M 8/04746*** | (2016.01) |
| ***H01M 8/04828*** | (2016.01) |
| ***H01M 8/248*** | (2016.01) |

(52) U.S. Cl.
CPC ... *H01M 8/04074* (2013.01); *H01M 8/04029* (2013.01); *H01M 8/04388* (2013.01); *H01M 8/04708* (2013.01); *H01M 8/04753* (2013.01); *H01M 8/04768* (2013.01); *H01M 8/04835* (2013.01); *H01M 8/248* (2013.01)

(58) Field of Classification Search
CPC ......... H01M 8/04074; H01M 8/04029; H01M 8/04388; H01M 8/04708; H01M 8/04753; H01M 8/04768; H01M 8/04835; H01M 8/248
See application file for complete search history.

(56) References Cited

U.S. PATENT DOCUMENTS 4,572,876 A 2/1986 Spurrier
2003/0054223 A1 * 3/2003 Baba ................ H01M 8/04291 429/413
2005/0026009 A1 * 2/2005 Kusakabe ............ H01M 8/241 429/492
2006/0188771 A1 * 8/2006 Allen .................... H01M 8/248 429/511
2008/0152972 A1 * 6/2008 Igarashi ........... H01M 8/04402 429/432
(Continued)

OTHER PUBLICATIONS

The International Search Report for International Application No. PCT/US2025/048991, dated Feb. 4, 2026, 1 page.

*Primary Examiner* — Stephen J Yanchuk
(74) *Attorney, Agent, or Firm* — WARNER NORCROSS + JUDD LLP

(57) ABSTRACT

A fuel cell stack comprises two of an interface plate, two or more of an air plate, two or more of a reaction cell, at least one of a fuel-air bipolar plate, and at least one of a fuel-coolant bipolar plate defining a cooling surface. The two of an interface plate, the two or more of an air plate, the two or more of a reaction cell, the at least one of a fuel-air bipolar plate, and the at least one of a fuel-coolant bipolar plate are arranged to provide a reaction cell to cooling surface ratio within the fuel cell stack of from 1:1 to 10:1.

27 Claims, 17 Drawing Sheets

2:1 REACTION CELL TO COOLING SURFACE RATIO

(56) References Cited

U.S. PATENT DOCUMENTS

| | | | | |
|---|---|---|---|---|
| 2010/0190082 | A1 | 7/2010 | Lee et al. | |
| 2011/0236797 | A1* | 9/2011 | Chaudron | H01M 8/04089 429/511 |
| 2012/0094196 | A1* | 4/2012 | Eickhoff | H01M 8/04089 429/414 |
| 2015/0111125 | A1 | 4/2015 | Farrington | |
| 2015/0221962 | A1* | 8/2015 | O'Neill | H01M 8/04074 429/434 |
| 2017/0098852 | A1* | 4/2017 | Carnevale | H01M 8/0202 |
| 2019/0088974 | A1* | 3/2019 | Jensen | H01M 8/12 |
| 2024/0396060 | A1* | 11/2024 | Mason | H01M 8/006 |

* cited by examiner

1:1 REACTION CELL TO COOLING SURFACE RATIO

2:1 REACTION CELL TO COOLING SURFACE RATIO

PEM FUEL CELL STACK

CROSS-REFERENCE TO RELATED APPLICATION

This application claims the benefit of U.S. Provisional Application 63/701,859, filed Oct. 1, 2024, the disclosure of which is incorporated by reference in its entirety.

FIELD OF THE DISCLOSURE

The present disclosure relates to a polymer electrolyte membrane (PEM) fuel cell stack.

BACKGROUND

Fuel cells are electrochemical energy conversion devices that convert an external source of fuel into electrical current. Many fuel cells use hydrogen as the fuel and oxygen (typically from air) as an oxidant. Water is produced in an exothermic chemical reaction between the hydrogen and the oxygen. As such, the environmental impact is minimal. For an increasing number of applications, fuel cells are more efficient than conventional power generation, such as combustion of fossil fuel, as well as portable power storage, such as lithium-ion batteries.

The chemical reaction between hydrogen and oxygen releases electrons and thus the fuel produces electrical work (i.e., current). In a fuel cell "stack" a plurality of fuel cells are combined in an electrical series resistor circuit to produces a desired power output. The number of fuel cells included in a particular cell stack is often dictated by the desired power output. As such, the collection or "stacking" of the plurality of fuel cells provides a required current flow (Amps) and stack power (Watts).

One common fuel cell is the polymer exchange membrane (PEM) fuel cell, which uses hydrogen as the fuel and oxygen (usually air) as its oxidant. The efficiency of a PEM fuel cell can be improved by optimizing operating parameters such as operating temperature and pressure. The efficiency of the fuel cell can also be improved by optimizing the temperature, moisture content, and feed rate of the hydrogen fuel consumed. In a PEM fuel cell stack, management of the hydrogen fuel feed and the processing parameters impacts efficiency. However, dynamically controlling processing parameters of a fuel cell stack can be particular challenging. In particular, operation of the plurality of PEM fuel cells makes it difficult to manage hydrogen fuel supply and operating temperatures and pressures because of the in-series arrangement of the plurality of PEM fuel cells within the PEM fuel cell stack and the heat generated by the exothermic chemical reactions that occur in each PEM fuel cell. Plus, efficiency of the PEM fuel cell stack is impacted by uniform cell-to-cell compression over the entire PEM surface, which is difficult to maintain operating at varying temperatures and pressures and mechanical stresses.

Considering the challenges presented, there remains a continued need for an improved PEM fuel cell stack.

SUMMARY

A fuel cell stack is disclosed. The fuel cell stack comprises two of an interface plate, two or more of an air plate, two or more of a reaction cell (also referred to as a fuel cell), at least one of a fuel-air bipolar plate, and at least one of a fuel-coolant bipolar plate defining a cooling surface. The two of an interface plate, the two or more of an air plate, the two or more of a reaction cell, the at least one of a fuel-air bipolar plate, and the at least one of a fuel-coolant bipolar plate are arranged to provide a reaction cell to cooling surface ratio within the fuel cell stack of from 1:1 to 10:1.

In one embodiment a method of assembling the fuel cell stack is also disclosed. The method includes the step of arranging the two of an interface plate, the two or more of an air plate, the two or more of a reaction cell, the at least one of a fuel-air bipolar plate, and the at least one of a fuel-coolant bipolar plate to create a reaction cell to cooling surface ratio within the fuel cell stack of from 2:1 to 6:1. The method also includes the step of tightening a plurality of dynamic fasteners to activate a plurality of biasing elements and provide a compression displacement of a length of the fuel cell stack of from 6 to 16 mm.

In another embodiment, a method of generating power with a fuel cell stack having an anode side and a cathode side is disclosed. The fuel cell stack includes a hydrogen mass flow controller that is in fluidic communication with a fuel inlet port on the anode side. The fuel cell stack also includes a digital differential pressure regulator in fluidic communication with the fuel inlet port and a fuel outlet port on the anode side. The digital differential pressure regulator is in electronic communication with the hydrogen mass flow controller. The hydrogen mass flow controller provides a hydrogen feed stream to the anode side of the fuel cell at a hydrogen flow rate. The digital differential pressure regulator determines a pressure differential between the fuel inlet port and the fuel outlet port. In turn, the hydrogen flow rate is adjusted to achieve a target pressure differential.

In yet another embodiment, a method of humidifying a hydrogen feed stream while generating power with a fuel cell stack having an anode side and a cathode side is disclosed. The fuel cell stack comprises two of an interface plate, two or more of an air plate, two or more of a reaction cell, at least one of a fuel-air bipolar plate, at least one of a fuel-coolant bipolar plate, a passive water management membrane, and a plurality of dynamic fasteners disposed in a plurality of pressurization channels located on a perimeter of the fuel cell stack. The anode side of the fuel cell stack is supplied with a hydrogen feed stream and the cathode side of the fuel cell stack is supplied with oxygen, typically within air. Water is supplied to a coolant flow path defined by the fuel cell stack. Water flows through the coolant flow path and cools the two or more of a reaction cell. The passive water management membrane, which comprises a sulfonated tetrafluoroethylene-based fluoropolymer-copolymer, is contacted with the water used to cool the two or more of a reaction cell. The hydrogen feed stream, which is also in contact with the passive water management membrane, is humidified via a process of back diffusion.

These and other features of the disclosure will be more fully understood and appreciated by reference to the description of the examples and the drawings.

Before the examples of the disclosure are explained in detail, it is to be understood that the disclosure is not limited to the details of operation or to the details of construction and the arrangement of the components set forth in the following description or illustrated in the drawings. The disclosure may be implemented in various other examples and of being practiced or being conducted in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various examples. Unless otherwise expressly stated, the use of enumeration should not be construed as limiting the disclosure to any specific order or number of components. Nor should the use of enumeration be construed as excluding from the scope of the disclosure any additional steps or components that might be combined with or into the enumerated steps or components.

DETAILED DESCRIPTION

Figure 1:
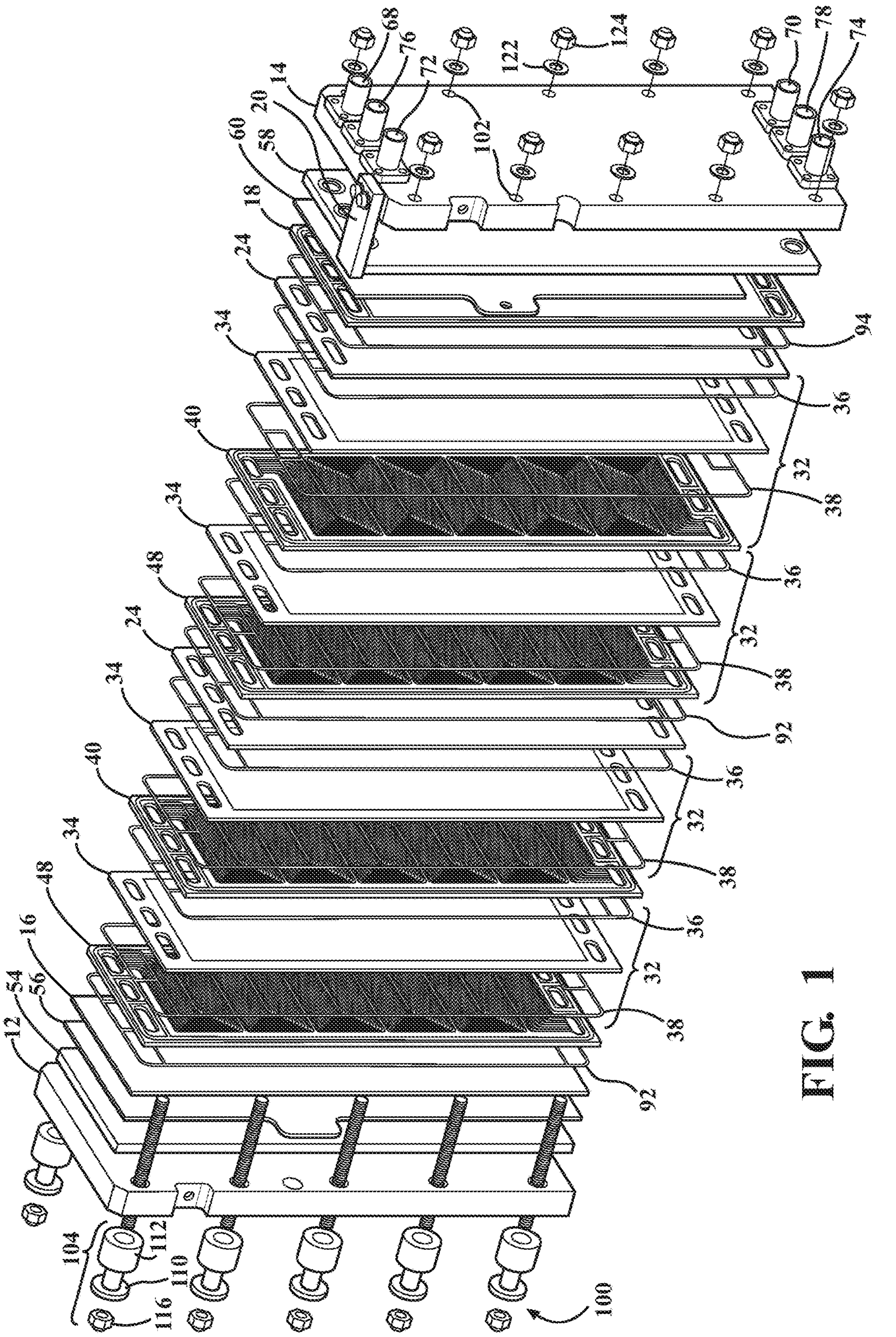
FIG. 1 is an exploded perspective view of an embodiment of the fuel cell stack disclosed herein.

A fuel cell stack is provided. While discussed herein in connection with a polymer exchange membrane (PEM) fuel cell stack, the subject fuel cell stack is suitable for a wide range of applications and is not limited to a polymer exchange membrane (PEM) fuel cell stack. Referring to FIGS. 1-11, wherein like numerals indicate corresponding parts throughout the several views, the fuel cell stack ("cell stack") is illustrated and generally designated at 10. Various embodiments of the cell stack 10 can be assembled with a limited number of modular components offering design flexibility and cooling options. Many different embodiments of the cell stack 10 allow for the efficient generation of power.

The cell stack 10 can be used in a variety of applications including, but not limited to, transportation, material handling, military and defense, stationary power, portable power applications. The cell stack 10 can be used in hydrogen fuel cell electric vehicles (FCEVs). These vehicles include cars, buses, trucks, trains, tanks, and other military vehicles. The cell stack 10 can also be used in stationary power applications, providing electricity and heat for residential, commercial, industrial, and military buildings. The cell stack 10, which can be referred to as a combined heat and power (CHP) unit, is especially valuable in locations where dependable, off-grid power is necessary, or where there is a need to reduce carbon emissions. The cell stack 10 is also used in backup power systems, ensuring continuous power supply for critical infrastructure such as hospitals, data centers, and telecommunication networks.

The cell stack 10 is easy to assemble, design-flexible, compact, and efficient, which makes it ideal for portable power applications. The cell stack 10 can be used in a variety of portable devices and systems, including military equipment, remote sensors, and small electronics like laptops and portable chargers. The cell stack 10 is particularly useful in situations where long-lasting, reliable power is needed in remote locations, where conventional batteries would be impractical due to their limited energy density and recharge requirements.

The cell stack 10 can be used in forklifts and other material handling equipment, particularly in warehouses and distribution centers. The cell stack 10 offers several advantages over traditional lead-acid batteries, such as faster refueling times and longer operational periods, which lead to increased productivity. Additionally, the cell stack 10 produces no emissions, making it suitable for indoor use where air quality is a concern.

Referring now to FIGS. 1-11, the cell stack 10 includes two or more of a reaction cell 32 (also referred to as a fuel cell, hence fuel cell stack) comprising membrane electrode assembly disposed between two of a gasket (a cathode seal and an anode seal). The two or more of the reaction cell 32 work together to convert chemical energy directly into electrical energy. Each two or more of the reaction cell 32 includes a membrane electrode assembly (MEA) 34, which is the core component of the reaction cell 32. In a typical embodiment, the MEA 34 includes a frame comprising a rigid material, e.g., a metal, which surrounds a polymeric membrane, e.g., a sulfonated tetrafluoroethylene-based fluoropolymer-copolymer membrane. In a typical embodiment, the membrane is either mechanically engaged with and/or adhesively bonded to the frame. The polymeric membrane comprises, consists of, or consists essentially of, a polymer that conducts protons and is sandwiched between an anode side and a cathode side of the reaction cell 32. In a typical embodiment, the MEA 34 comprises a sulfonated tetrafluoroethylene-based fluoropolymer-copolymer. The reaction cell 32 typically has a surface area (e.g., polymeric membrane surface area) of from 250 to 650, from 300 to 600, from 350 to 550, or about 440 $cm^3$.

In a typical embodiment, the cell stack 10 includes from 30 to 90 of the reaction cell 32. Alternatively, in a typical embodiment, the cell stack 10 includes a number of reaction cells sufficient to provide an output of from 2 to 20 kW.

On the anode side, hydrogen gas is introduced and splits into protons and electrons. The protons pass through the membrane, while the electrons are directed through an external circuit, generating electrical power. On the cathode side, oxygen from the air reacts with the protons that have crossed the membrane and the electrons returning from the external circuit, forming water as the only byproduct. This reaction at the cathode generates heat, which should be managed. In a typical embodiment, the two or more of the reaction cell 32 are connected in series or in parallel, depending on the design requirements.

The cell stack 10 also includes an internal circuit or an electrical pathway comprising a plurality of buss plates or bars, typically a first buss plate 56 and a second buss plate 60. Adjacent the buss plates is typically an isolation plate. The cell stack 10 can include one or more isolation plates. Many of the embodiments illustrated herein include a first isolation plate 54 and a second isolation plate 58 located adjacent the first buss plate 56 and the second buss plate 60, respectively. In a typical embodiment, the two or more reaction cells 32 are connected in series to increase the overall voltage. Some embodiments, include an additional isolation plate to isolate a sequence of plates used to humidify the incoming fuel (hydrogen stream) with the passive water management membrane 66. The first and the second buss plates 56, 60 link the positive terminal of one cell to the negative terminal of the adjacent cell. Each of the reaction cell 32 generates a small voltage, which is collected by the internal circuit. Referring now to the Figures, the cell stack 10 typically includes the first and a second buss plates 56, 60. The electrical circuit provides a pathway for the electrical current generated by the two or more reactions cells, the first and the second buss plate 56, 60 collect the electrical current and transfer it to an external circuit. That is, the first and the second buss plate 56, 60 collect and distribute electrical current generated in the at least two of the reaction cell 32. This ensures that the current flows sequentially through all the cells in the stack. The first and the second buss plate 56, 60 typically have high electrical conductivity and comprise metal. In a typical embodiment, the first and the second buss plate 56, 60 comprises copper, aluminum, or an alloy thereof. As such, the first and the second buss plate 56, 60 provides minimal resistance and efficient current flow.

From a practical perspective, the first and the second buss plate 56, 60 also serve to collect the current evenly across two or more of the reaction cell 32, ensuring that no single reaction cell is overloaded, which can prevent hotspots and improve the longevity and performance of the cell stack 10. In a typical embodiment, the first and the second buss plate 56, 60 are insulated to prevent unintended short circuits between different parts of the cell stack 10. This insulation ensures that the current flows on the internal circuit in a particular path.

The cell stack 10 defines three fluid passageways. A fuel passageway, an air passageway, and a cooling fluid passageway. The cell stack 10 includes a plurality of plates, which are described in detail below. Each end of each plate typically defines an orifice adjacent a first side of the plate which partially defines a primary fuel channel, a central orifice which partially defines a primary cooling channel, and an orifice adjacent a second side of the plate which partially defines a primary air channel. The primary air channel typically has a greater width and a shallower depth that the main fuel channel.

The fuel passageway provides a flow path for fuel, e.g., hydrogen, within the cell stack 10. Referring now to FIG. 1, the fuel passageway includes at least one of a fuel inlet port 68, at least one of a fuel outlet port 70, the primary fuel channel, and a plurality of the plurality of fuel channels (the anode side of each reaction cell typically includes a plurality of fuel channels), which are defined by the various plates of the cell stack 10. The fuel passageway feeds the anode side of each reaction cell 32 of the cell stack 10. With reference to the Figures, the primary fuel channel runs along both sides of the cell stack 10, and is defined by an opening located adjacent a second edge on the first and second ends of the plates included in the cell stack 10.

The air passageway provides a flow path for air, e.g., hydrogen, within the cell stack 10. Referring now to FIG. 1, the air passageway includes at least one of an air inlet port 72, at least one of an air outlet port 74, the primary air channel, and a plurality of the plurality of air channels (the cathode side of each reaction cell typically includes a plurality of air channels), which are defined by the various plates of the cell stack 10. The air passageway feeds the cathode side of each reaction cell 32 of the cell stack 10. With reference to the Figures, the primary air channel runs along both sides of the cell stack 10, and is defined by an opening located adjacent a first edge on the first and second ends of the plates included in the cell stack 10. In the embodiments illustrated in the drawings, the primary air channel has a greater width and a shallower depth that the primary fuel channel.

The cooling fluid passageway provides a flow path for a cooling fluid, e.g., water, within the cell stack 10. Referring now to FIG. 1, the cooling fluid passageway includes at least one of a cooling fluid inlet port 76, at least one of a cooling fluid outlet port 78, the primary cooling fluid channel, and a plurality of the plurality of cooling channels, which are defined by the various plates of the cell stack 10. The cooling fluid passageway allows for circulation of cooling fluid to control a temperature of (typically cool) the cell stack 10. With reference to the Figures, the primary cooling fluid channel runs along both sides of the cell stack 10, and is defined by a central opening on the first and second ends of the plates included in the cell stack 10.

Referring now to FIG. 1, the cell stack 10 includes an assembly alignment bar 20. In the embodiment illustrated, the assembly alignment bar 20 is secured or anchored to the second compression plate 14, but can be anchored to either the first or the second compression plate 12, 14 depending on the embodiment. Of course, the length of the assembly alignment bar 20 varies with a length (L) of the cell stack 10, which varies accordingly with the number of plates included in the cell stack 10.

In addition to the two or more of the reaction cell 32, the cell stack 10 can include any combination of the following building blocks, which can be mixed and matched to efficiently achieve various power outputs while controlling the temperature of the cell stack 10:

two of an interface plate (referred to as a first interface plate 16 and a second interface plate 18) defining a first interface surface, a second interface surface, and a buss slot;

two or more of an air plate 24 having a first air surface 26 and second air surface opposite said first air surface 26, wherein one of the first or second air surface 26, 28 defines a plurality of air channels 30 and the other, opposite surface is flat;

at least one of a fuel-air bipolar plate 40 having a first fuel-air surface and second fuel-air surface opposite said first fuel-air surface, wherein one of the first or second fuel-air surface defines a plurality of air channels 30 and the other, opposite surface defines a plurality of fuel channels 46;

at least one of a fuel-coolant bipolar plate 48 having a cooling surface 50 defining a plurality of cooling channels 22 and a fuel surface 52 defining a plurality of fuel channels 46 opposite said cooling surface 50; optionally, one or more of a fuel plate 88 having a fuel plate surface defining a plurality of fuel channels 46 and second flat surface opposite said fuel plate surface; optionally, one or more of a cooling plate 64 having a cooling plate surface defining a plurality of cooling channels 22 and flat surface opposite said cooling plate surface; optionally, one or more of a passive water management membrane 66.

Each of the interface plate, the air plate 24, the fuel-air bipolar plate 40, the fuel-coolant bipolar plate 48, the fuel plate 88, the cooling plate, and any other plates included in the cell stack 10 can comprise graphite, metal, carbon composite materials, or polymer materials. The different types of plates listed immediately above and included in the cell stack 10 can include the same material or different materials. For example, one embodiment of the cell stack 10 could include some plates comprising graphite and some plates comprising metal. As another example, one embodiment of the cell stack 10 could include some plates comprising graphite and some plates comprising carbon composites. Of course, another embodiment of the cell stack 10 could include all carbon plates. Generally speaking, the material used to form the plates is electrically and thermally conductive, durable, and electro chemical corrosion resistant.

In some embodiments, one or more of the plates comprise graphite, plates are conductive and efficiently conducting the current generated by the reaction cell 32, corrosion resistant to acidic environment of the two or more reaction cells 32, and can be machined into the complex flow field patterns required for distributing fuel, air, and cooling fluid (and also removing water).

In some embodiments, one or more of the plates comprise carbon composite materials, which can include graphite and polymer. Plates formed from carbon composites can be light weight and also strong and durable, while also providing conductivity and corrosion resistance.

In some embodiments, one or more of the plates comprise a metal or a coated metal. Suitable metals include, but are not limited to, stainless steel, titanium, and aluminum. If stainless steel or aluminum is utilized, it is typically coated a protective coating comprising gold, titanium nitride, carbon, or nitride to prevent corrosion in the acidic reaction cell environment.

In some embodiments, one or more of the plates comprise conductive polymeric compositions. Conductive polymeric compositions typically include a conductive filler such as carbon nanotubes or graphite. Conductive polymers can be molded into complex shapes and offer good corrosion resistance while still providing the necessary electrical conductivity.

The interface plates are located at the first and the second end of the cell stack 10, next to a first and the second buss plate 56, 60. As explained above, the two of an interface plate can be referred to as the first interface plate 16 and the second interface plate 18. The first and the second interface plates 16, 18 are called interface plates because each plate includes a buss slot for receiving the first and the second buss plate 56, 60, respectively. Each buss plate is in electrical contact each respective compression plate (typically comprising graphite) to allow the flow of electrons which generates electrical current flow through the cell stack 10. The first and the second interface plate 16, 18 can have different configurations. Generally, each of the first interface plate 16 and the second interface plate 18 has a first surface and a second surface opposite the first surface. The first surface can be flat or define a plurality of channels. Likewise, the second surface can be flat or define a plurality of channels. If a plurality of channels are defined, the channels can be fuel channels, air channels, or cooling channels.

For example, in the embodiments of the fuel cell set forth in FIGS. 1, 2, 5B, and 10 the cell stack 10 includes the first interface plate 16 defining a first surface that is flat and a second surface defining the plurality of air channels 30 and the second interface plate 18 having a first surface that is flat and a second surface that is flat. In this embodiment, the first interface plate 16 is similar to the air plate 24, but unlike the air plate 24 the first interface plate 16 has a buss slot for receiving the first buss plate 56.

Figure 11:
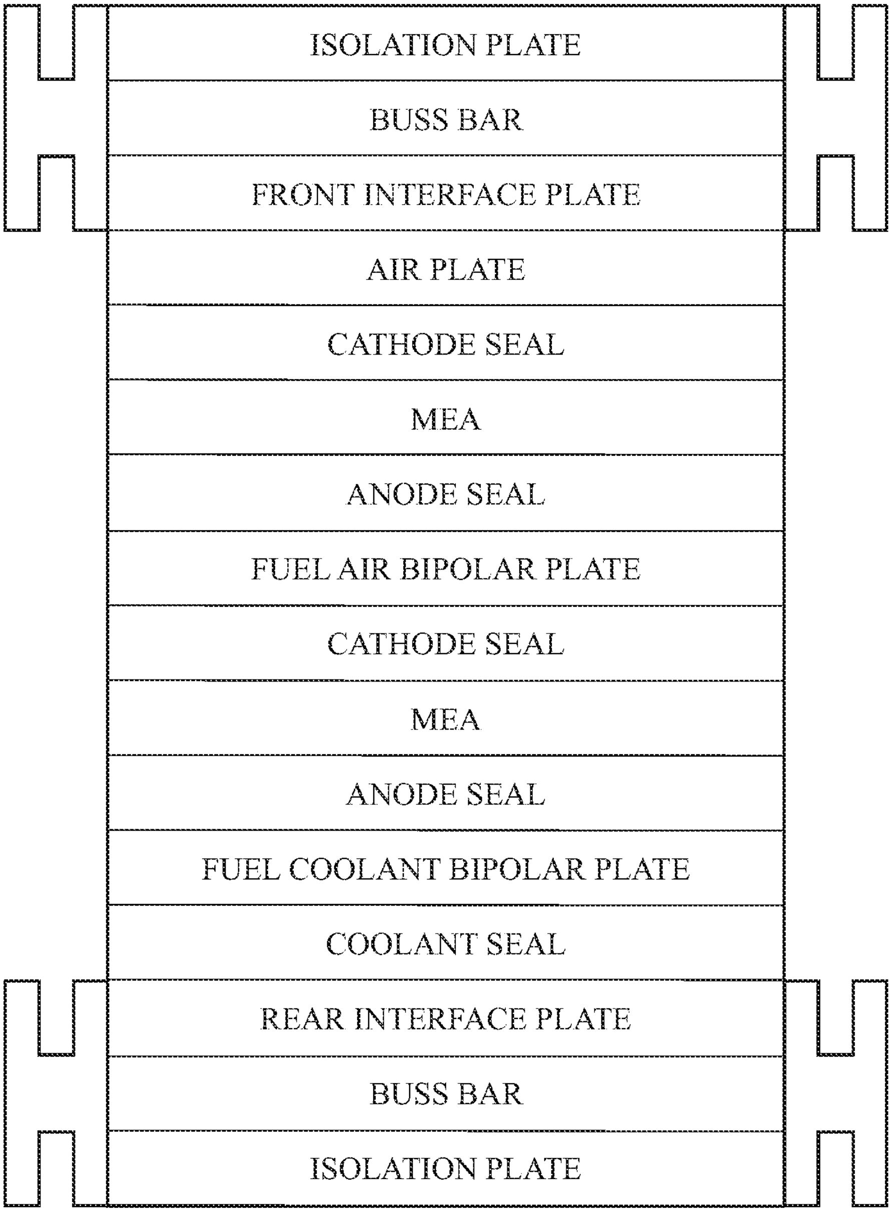
FIG. 11 is a schematic drawing illustrating an example embodiment of a fuel cell stack having a 2:1 reaction cell to cooling surface ratio.

As another example, in the embodiment of the cell stack 10 set forth in FIG. 11, the cell stack 10 includes first interface plate 16 defining a first surface defining the plurality of cooling channels 22 and a second surface defining the plurality of air channels 30 and second interface plate 18 having a first surface that is flat and a second surface defining the plurality of air channels 30. In this embodiment, the first interface plate 16 has a buss slot for receiving the first buss plate 56 and the second interface plate 18 is similar to what is referred to herein as the air plate 24, but unlike the air plate 24, the second interface plate 18 has a buss slot for receiving the second buss plate 60.

Figure 2:
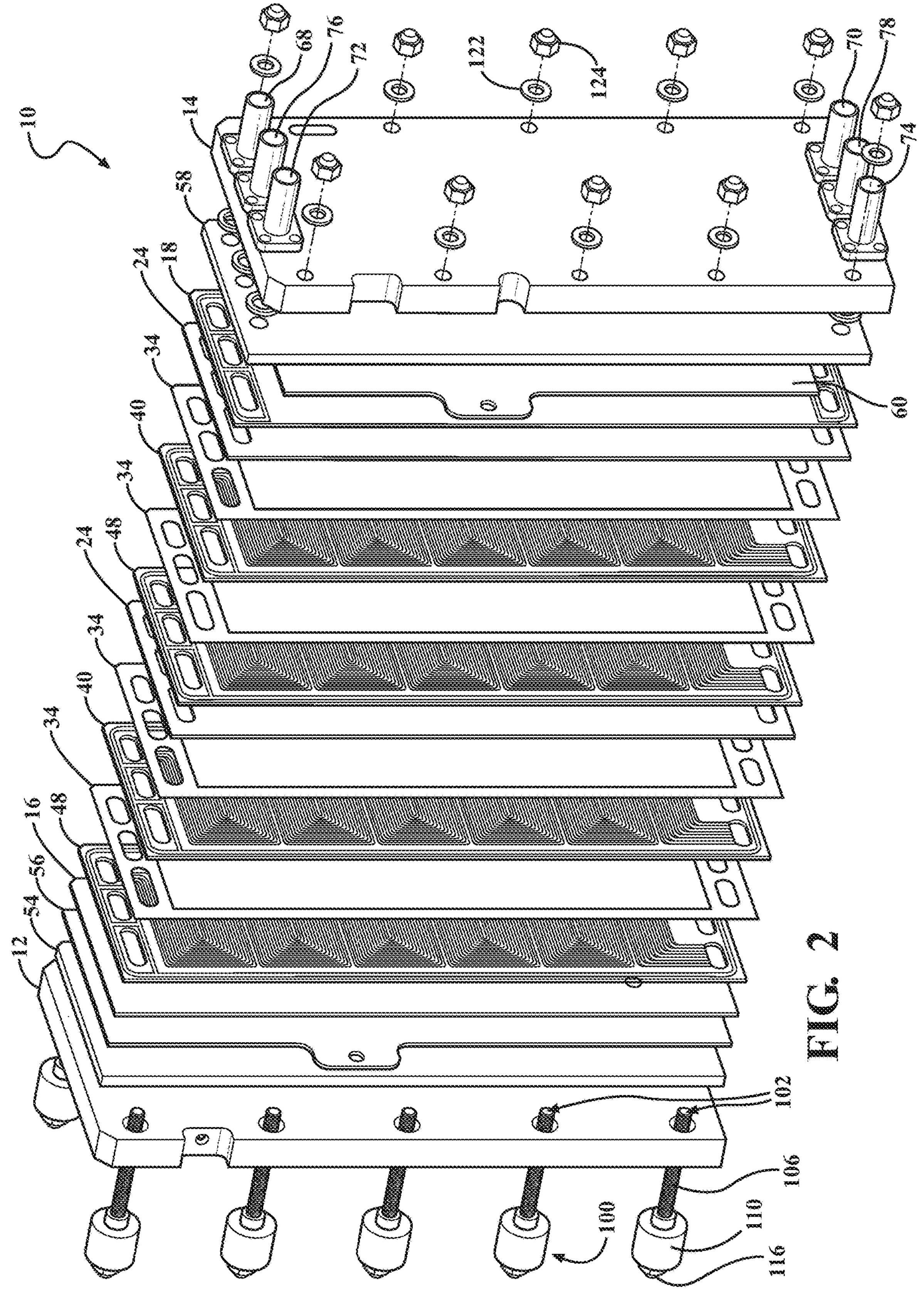
FIG. 2 is an exploded perspective view of the fuel cell stack of FIG. 1 with a plurality of gaskets removed.

The cell stack 10 also comprises two or more of the air plate 24 having a first and a second air surface 26, 28, one is flat and the other defines the plurality of air channels 30. The air plate 24 can be used to provide a flat surface adjacent a plurality of channels, e.g., cooling channels, defined by the surface of another plate and a surface defining the plurality of air channels that provide air (i.e., oxygen) to the cathode side of the reaction cell 32. In the embodiment of FIGS. 1 and 2, each of the air plate 24 has a first air surface 26 that defines a plurality of fuel channels 46, which provide air (i.e., oxygen) to the cathode side of the reaction cell 32.

The cell stack 10 also comprises the at least one of a fuel-air bipolar plate 40 having the first fuel-air surface and the second fuel-air surface opposite said first fuel-air surface, wherein one of the first or second fuel-air surface defines a plurality of air channels 30 and the other, opposite surface defines a plurality of fuel channels 46. The plurality of air channels provide air (i.e., oxygen) to the cathode side of the reaction cell 32 and the plurality of fuel channels provide fuel (i.e., hydrogen) to the anode side of an adjacent reaction cell 32. In the embodiment of FIGS. 1 and 2, each of fuel-air bipolar plate 40 has a first fuel-air surface that defines a plurality of air channels 30, which provide air (i.e. oxygen) to the cathode side of the reaction cell 32 and the second fuel-air surface defines a plurality of fuel channels 46 that provide fuel (i.e. hydrogen) to the anode side of an adjacent reaction cell 32.

The cell stack 10 also comprises the at least one of the fuel-coolant bipolar plate 48 having the cooling surface 50 defining a plurality of cooling channels 22 and the fuel surface 52 defining a plurality of fuel channels 46 opposite said cooling surface 50. As is illustrated in FIGS. 1 and 2, the plurality of fuel channels 46 of the cooling surface 50 of the fuel-coolant bipolar plate 48 provide fuel to the anode side of the reaction cell 32. The plurality of cooling channels 22 of the cooling surface of the fuel-cooling bipolar plate is typically adjacent a flat surface (the first or the second surface 26, 28) of the air plate 24 and provide cooling fluid to manage the heat generated by the reaction cells 32 in the cell stack 10. In the embodiment of FIGS. 1 and 2, the cooling surface 50 defines a plurality of cooling channels and the second fuel coolant surface defines a plurality of air channels that provide air (i.e., oxygen) to the cathode side of the reaction cell 32.

From a design perspective, the fuel-coolant bipolar plate 48 allows the construction of embodiments of the cell stack 10 including the two of an interface plate, the two or more of the air plate 24, the two or more of the reaction cell 32, the at least one of the plurality of air channels 30, and the at least one of the fuel-coolant bipolar plate 48 having a reaction cell to cooling surface ratio within the cell stack 10 of from 1:1 to 10:1, from 2:1 to 6:1, from 2:1 to 4:1, or from 3:1 to 5:1. This ratio is, in some aspects, enabled by the ability to use a combination of plates that allow one or more of a cooling surface within the cell stack 10. As such, in many embodiments, the cell stack 10 includes, 2, 3, 4, 5, 6, 7, 8, 9, 10, or more of the cooling surface within the cell stack 10.

In the embodiment of FIGS. 1-3B, the cell stack 10 has a reaction cell to cooling surface ratio of from 2:1. In this embodiment, the cell stack 10 has four reaction cells 32 and two cooling surfaces (on the two fuel-coolant bipolar cells). This particular embodiment is built with a repeating sequence of plates as is best illustrated in FIG. 2. The repeating sequence (from the first end to the second end of the cell stack 10) including: the fuel-coolant bipolar plate 48 having the fuel surface 52 and the cooling surface 50, the MEA 34, the fuel-air bipolar plate 40 having the first fuel-air surface and the second fuel-air surface, the MEA 34, and the air plate 24 having the first air surface 26 that defines a plurality of fuel channels 46. In the embodiment illustrated, this sequence (48, 34, 40, 34, 24) repeats twice. This sequence can be repeated to achieve a desired number of reaction cells 32 for a desired power output. A seal or gasket is also illustrated between the air plate and the second interface plate 18.

Figure 5A:
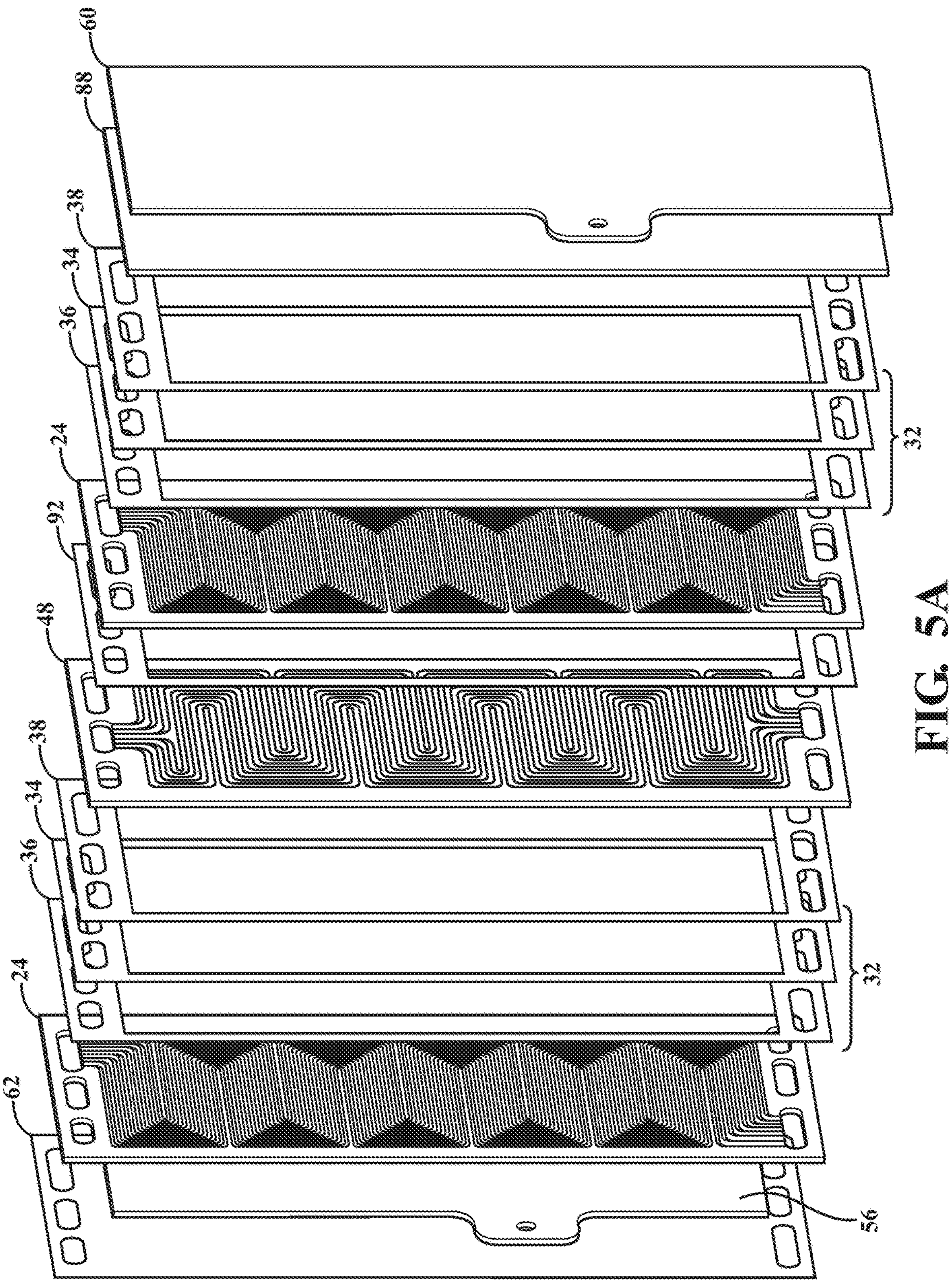
FIG. 5A is an exploded view of another embodiment of the cell stack.
Figure 5B:
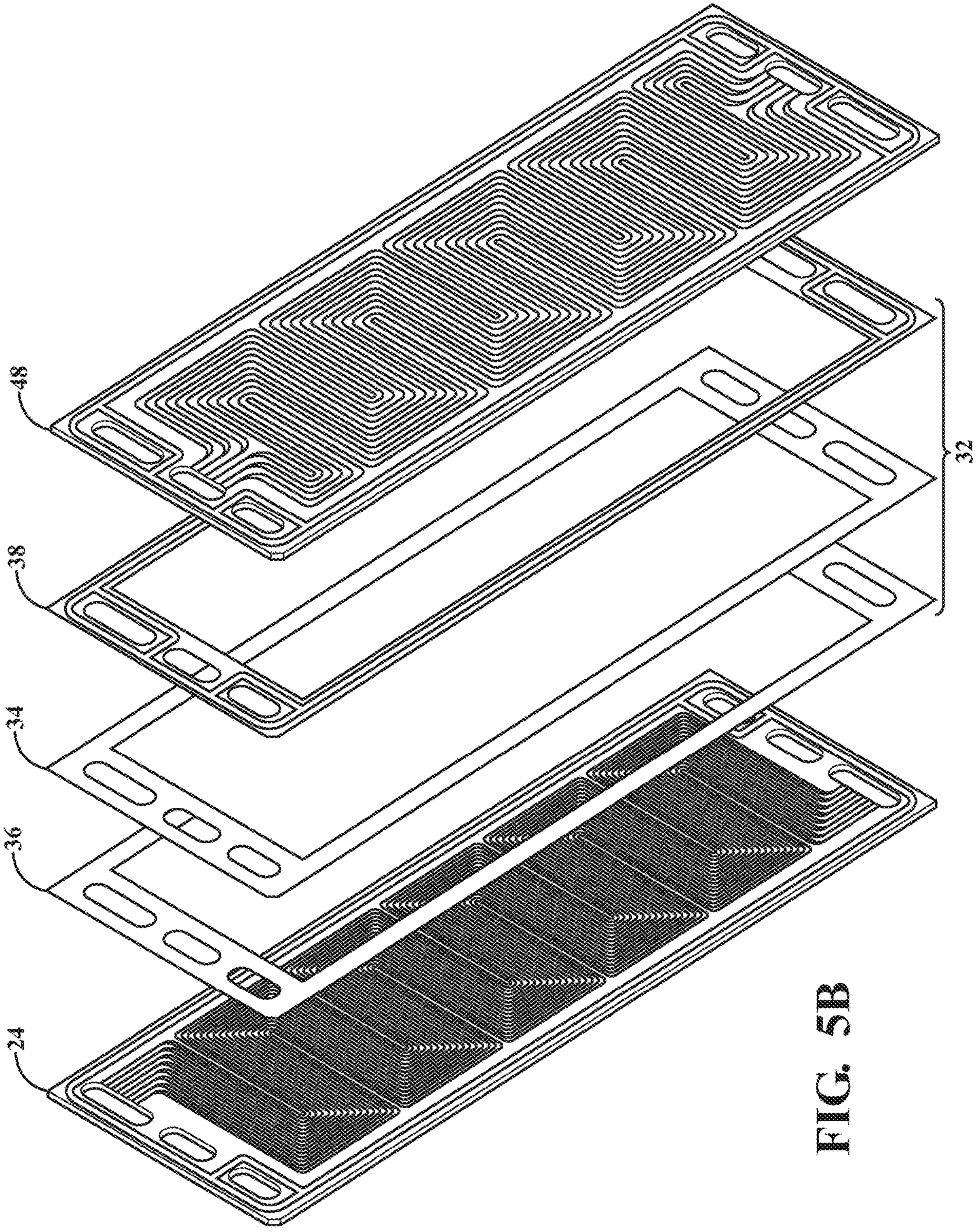
FIG. 5B is an exploded isolated view of a fuel-air bipolar plate, a cathode seal, a reaction cell, an anode seal, and a fuel-coolant bipolar plate within the cell stack of FIG. 5A.

FIG. 5A is an exploded view of another embodiment of the cell stack 10. This particular embodiment includes (from the first end to the second end of the cell stack 10) the air plate 24, the cathode seal 36, the MEA 34, the anode seal 38, the fuel-coolant bipolar plate 48, a coolant seal or gasket 92, the air plate 24, the cathode seal 36, the MEA 34, the anode seal 38, and a fuel plate 88. The embodiment of FIG. 5A has a reaction cell to cooling surface ratio of from 2:1. FIG. 5B is an exploded isolated view of the air plate 24, the cathode seal 36, the MEA 34, the anode seal 38, and the fuel-coolant bipolar plate 48, at the first end of the cell stack 10 of FIG. 5A.

Figure 10:
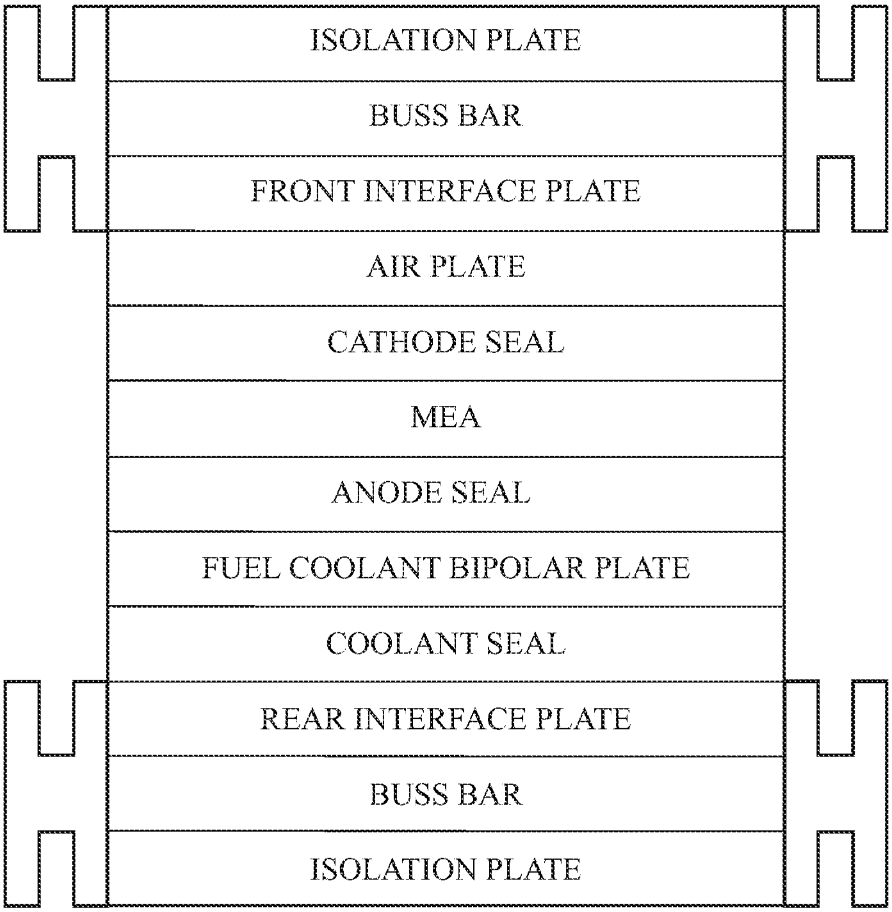
FIG. 10 is a schematic drawing illustrating an example embodiment of a fuel cell stack having a 1:1 reaction cell to cooling surface ratio.

FIG. 10 is a schematic drawing illustrating an example embodiment of the cell stack 10 having a 1:1 reaction cell to cooling surface ratio whereas FIG. 11 is a schematic drawing illustrating an example embodiment of the cell stack 10 having a 2:1 reaction cell to cooling surface ratio.

In the embodiment of the cell stack 10 set forth in FIG. 10, the cell stack 10 includes:

- a first isolation plate 54;
- a first buss bar/plate 62;
- a first/front interface plate 16 having a buss slot for receiving the first buss plate 62;
- an air plate 24;
- a cathode seal 36;
- a MEA 34;
- an anode seal 38;
- a fuel-coolant bipolar plate 48;
- a coolant seal or gasket 92;
- a second/rear interface plate 18 having a buss slot for receiving the second buss plate 60;
- a second buss plate/bar 60; and
- a second isolation plate 58.

It should be appreciated that FIG. 10 is included for illustration purposes and that embodiments disclosed herein may include additional plates/sequences of plates as described herein. For example, the sequence of plates above (24, 34, 48) as show or in reverse order can be repeated numerous times within the cell stack 10 as desired to achieve a desired output. It should be understood that additional reaction cells and different plate combinations can be included to change the ratio reaction cell to cooling surface ratio in the cell stack, e.g. from 1:1 to 3:1, 4:1, 5:1, etc. This number of cooling surfaces and reaction cells can be changed to achieve a desired number of reaction cells 32 to achieve a desired power output while effectively controlling the temperature of the cell stack 10.

In the embodiment of the cell stack 10 set forth in FIG. 11, the cell stack 10 includes (from right to left):

- a first isolation plate 54;
- a first buss plate/bar 62;
- a first/front interface plate 16 having a buss slot for receiving the first buss plate 62;
- an air plate 24;
- a cathode seal 36;
- a MEA 34;
- an anode seal 38;
- a fuel-air bipolar plate 40;
- a cathode seal 36;
- a MEA 34;
- an anode seal 38;
- a fuel-coolant bipolar plate 48;
- a coolant seal or gasket 92;
- a second/rear interface plate 18 having a buss slot for receiving the second buss plate 60;
- a second buss plate/bar 60; and
- a second isolation plate 58.

It should be appreciated that FIG. 11 is included for illustration purposes and that embodiments disclosed herein may include additional plates/sequences of plates as described herein. For example, the sequence of plates above (24, 34, 40, 34, 48) as show or in reverse order can be repeated numerous times within the cell stack 10 as desired to achieve a desired output. It should be understood that additional reaction cells and plate combinations can be included to change the ratio reaction cell to cooling surface ratio in the cell stack, e.g. from 2:1 to 3:1, 4:1, 5:1, etc. This number of cooling surfaces and reaction cells can be changed to achieve a desired number of reaction cells 32 to achieve a desired power output while effectively controlling the temperature of the cell stack 10.

Figure 6A:
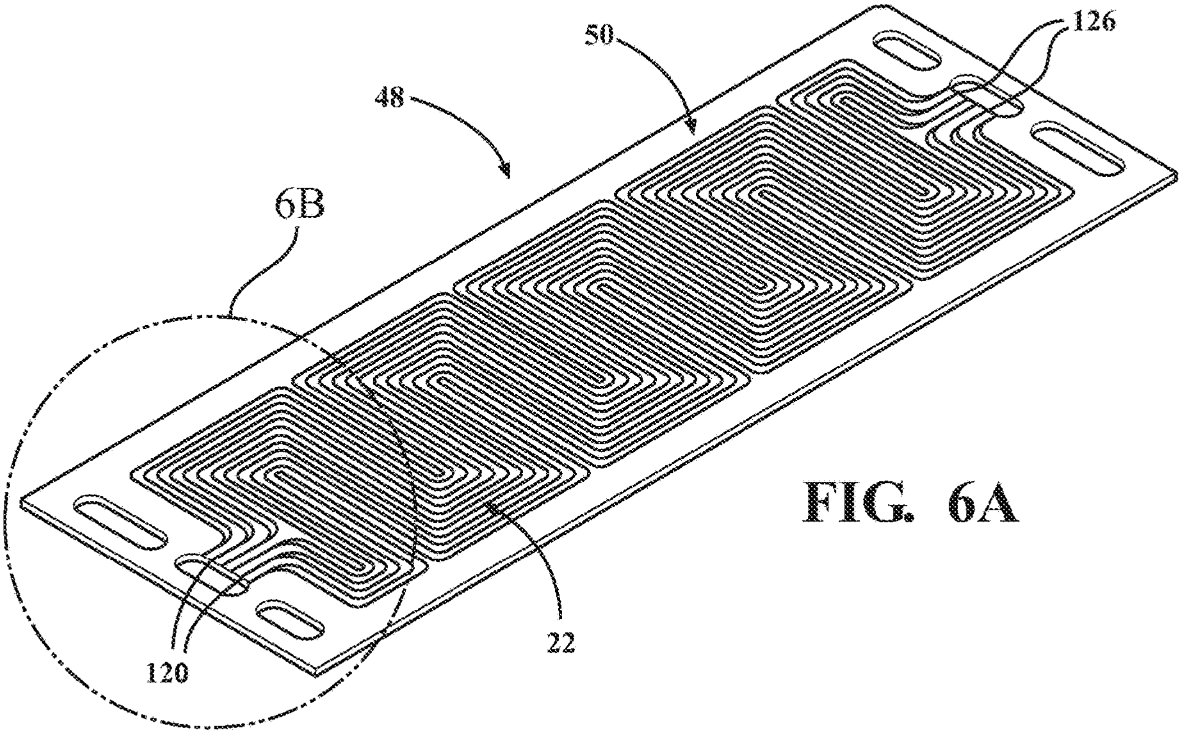
FIG. 6A is a front perspective view of a fuel-cooling bipolar plate having a cooling surface defining a plurality of cooling channels.
Figure 6B:
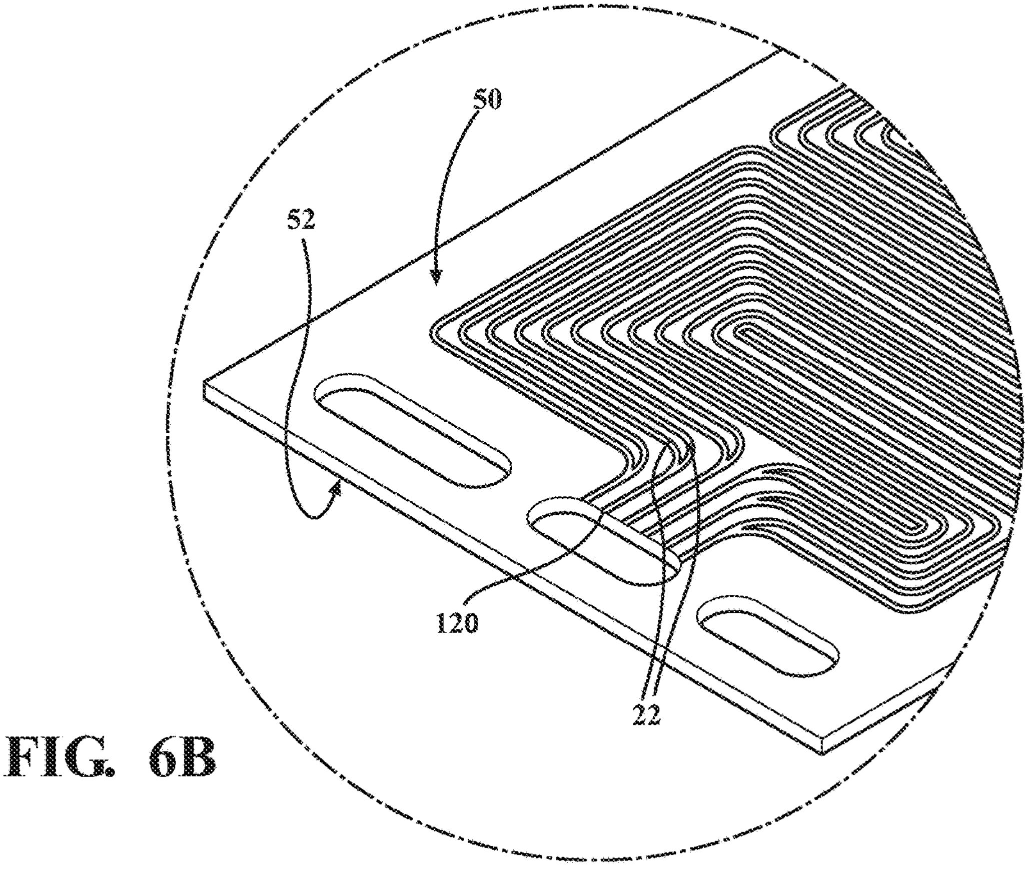
FIG. 6B is an enlarged view of the plurality of cooling channels of FIG. 6A illustrating six of a cooling fluid input port that split to feed twelve cooling channels.

As is set forth above, a plurality of cooling channels 22 can be defined by the cooling surface of the fuel-coolant bipolar plate 48, or the first or second surface of the interface plate. In a typical embodiment, the plurality of cooling channels includes from 4 to 26, from 8 to 20, from 12 to 20, or 18 cooling channels. In some embodiments, at least two of the cooling channels share a cooling input port 120 and a cooling output port 126. Referring now to FIGS. 6A and 6B, an embodiment of the fuel-coolant bipolar plate 48 having a cooling surface defining a plurality of cooling channels 22 is illustrated.

In some embodiments, the plurality of cooling channels 22 (defined by a cooling surface of the fuel-coolant bipolar plate 48 or a first or second surface of the two interface plates) can have a cooling input port to cooling channel ratio is from 1:1 to 1:4, or from 1:2 to 1:3. In the embodiment of FIGS. 6A and 6B, the plurality of cooling channels 22 has a cooling input port to cooling channel ratio of from 1:2, since each cooling input port feed branches into two cooling channels. Likewise, the two cooling channels can merge into a single cooling output port. As is illustrated in FIGS. 6A and 6B, the primary cooling fluid channel feeds six of the cooling input port 120, each of which split to form twelve cooling channels. In turn, at the other end of the plate, the twelve cooling channels merge into six of the cooling output port 126.

Each of the cooling channels have a depth and a width. In some embodiments, at least a portion of the cooling channels have an average width of from 0.75 to 3.25, from 1.25 to 2.75, from 1.5 to 2.0, or about 1.84 mm. In some embodiments, at least a portion of the cooling channels have an average channel depth of from 0.3 to 1.5, from 0.6 to 1.2, from 0.8 to 1.0, or about 0.9 mm. In some embodiments, each of the cooling channels is partially defined by a cooling interface surface proximal the reaction cell 32, and a cooling interface surface to channel depth ratio is from 2:1 to 1:2.

With reference now to FIGS. 6A and 6B, in some embodiments, the plurality of cooling channels 22 has a serpentine pattern. In some such embodiments, each of the plurality of cooling channels 22 have from 3 to 12 or from 6 to 10 180° turns. As you can see in FIG. 6A, the embodiment illustrated has twelve cooling channels defining a serpentine pattern, each of the cooling channels has eight 180° turns.

As is set forth above, a plurality of fuel channels 46 can be defined by the fuel surface 52 of the fuel-coolant bipolar plate 48, the first or second fuel-air surface of the fuel-air bipolar plate 40, or the first or second surface of the interface plate. In a typical embodiment, the plurality of fuel channels 46 includes from 4 to 26, from 8 to 20, from 12 to 20, or 18 fuel channels. In some embodiments, at least two of the fuel channels share a fuel input port 128 and a fuel output port 130.

Figure 7A:
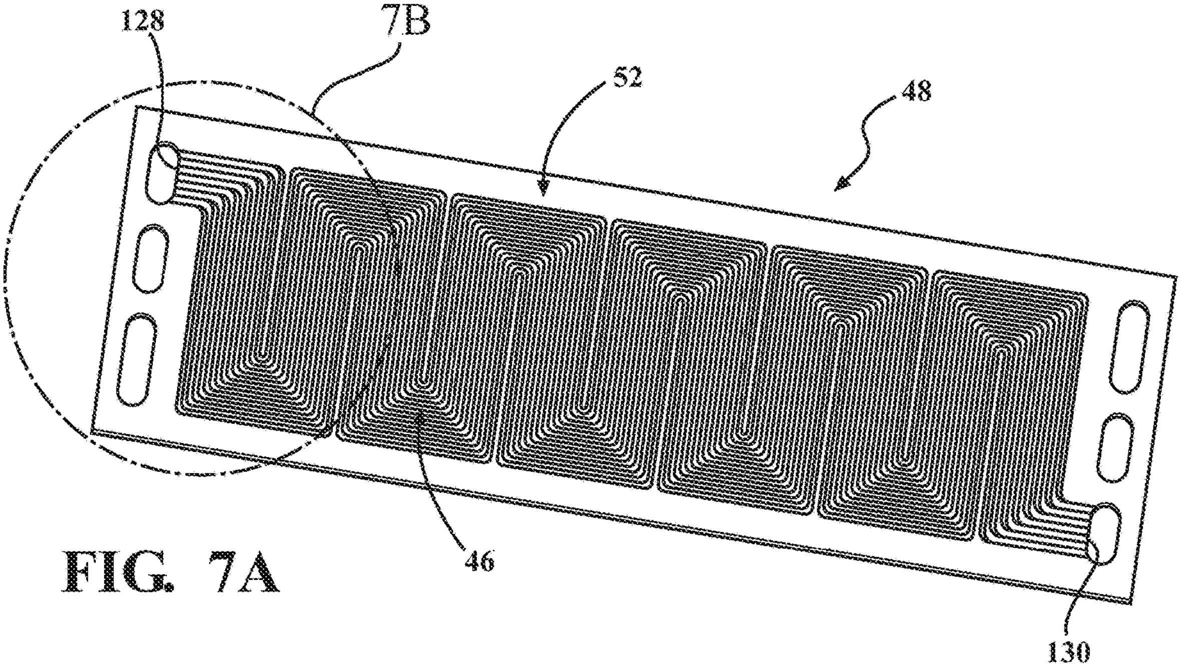
FIG. 7A is a rear perspective view of the fuel-cooling bipolar plate of FIG. 6A showing a fuel surface, which is opposite the cooling surface, defining a plurality of fuel channels.
Figure 7B:
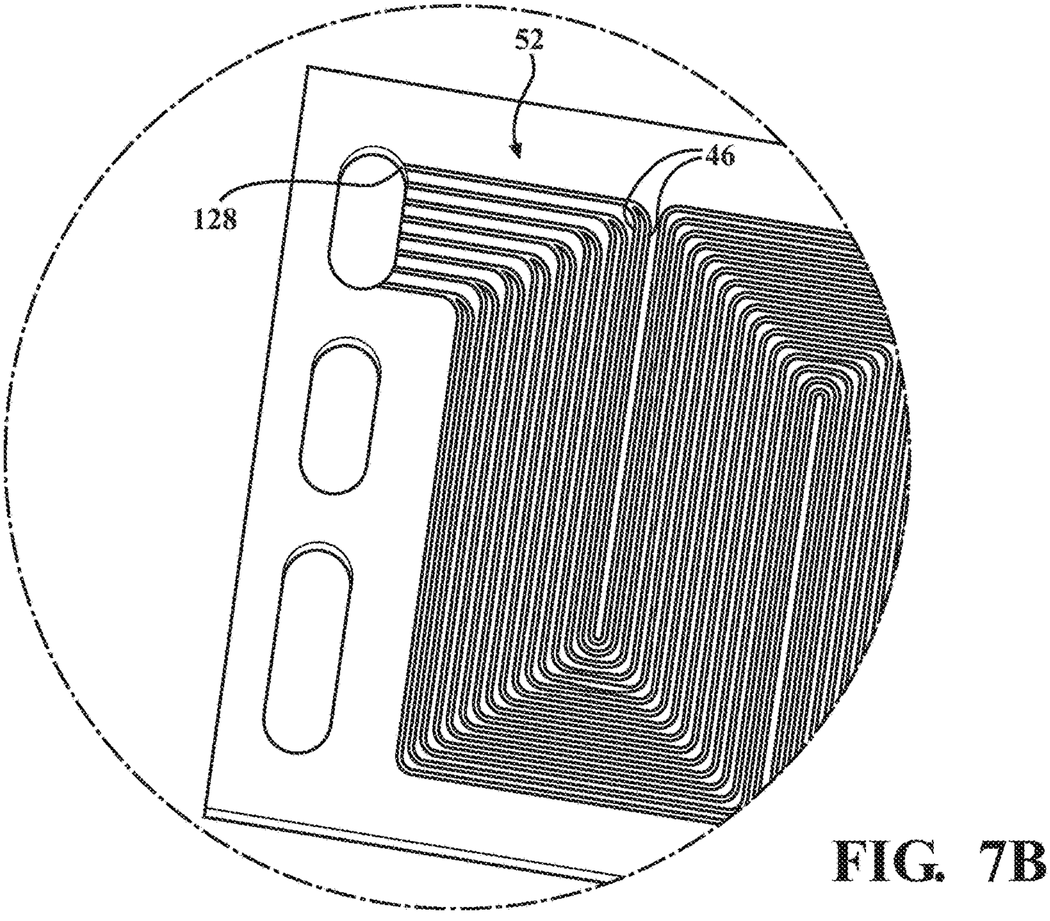
FIG. 7B is an enlarged view of the plurality of fuel channels of FIG. 7A illustrating eight of a plurality of a fuel input port that split to feed sixteen fuel channels.

Referring now to FIGS. 7A and 7B, an embodiment of the fuel-cooling bipolar plate having a fuel surface 52 defining a plurality of fuel channels 46 is illustrated. More specifically, FIG. 7A is a rear perspective view of the fuel-cooling bipolar plate of FIG. 6A showing the fuel surface 52, which is opposite the cooling surface 50, defining the plurality of fuel channels 46. FIG. 7B is an enlarged view of the plurality of fuel channels of FIG. 7A illustrating eight of the fuel input port 128, each of which split to feed sixteen fuel channels, which merge into eight of the fuel output port 130.

In some embodiments, the plurality of fuel channels 46 can have a fuel input port to fuel channel ratio from 1:1 to 1:4, or from 1:2 to 1:3. In the embodiment of FIGS. 7A and 7B, the plurality of fuel channels 46 has a fuel input port to fuel channel ratio of from 1:2, since each fuel input port splits into two fuel channels. Likewise, the two fuel channels can merge into a single fuel output port. As is illustrated in FIGS. 7A and 7B the primary fuel channel feeds eight of the fuel input port 128 which split to form sixteen fuel channels. In turn, at the other end of the plate, the sixteen fuel channels merge into eight of the fuel output port 130.

Each of the fuel channels have a depth and a width. In some embodiments, at least a portion of the fuel channels have an average width of from 0.75 to 3.25, from 1.25 to 2.75, from 1.5 to 2.0, or about 1.84 mm. In some embodiments, at least a portion of the fuel channels have an average channel depth of from 0.3 to 1.5, from 0.6 to 1.2, from 0.8 to 1.0, or about 0.9 mm. With continued reference now to FIGS. 7A and 7B, in some embodiments, the plurality of fuel channels 46 has a serpentine pattern. In some such embodiments, each of the plurality of fuel channels 46 have from 6 to 20 or from 8 to 12 180° turns. As you can see in FIGS. 7A and 7B, the embodiment illustrated has sixteen fuel channels defining a serpentine pattern, each of the fuel channels has ten 180° turns.

As is set forth above, the plurality of air channels 30 can be defined by the first fuel-air surface of the fuel-air bipolar plate 40, a first or second air surface 26, 28 of an air plate 24, or the first or second surface of the interface plate. The cell stack 10 includes multiple of the plurality of air channels 30. For example, the air plate can include a surface having the plurality of air channels 30, as can the plurality of air channels 30, as can one of the first and the second interface plate 16, 18. Each plate can define the same embodiment or a different embodiment (or configuration) of the plurality of air channels 30. In a typical embodiment, the plurality of air channels 30 includes from 4 to 26, from 8 to 20, from 12 to 20, or 18 air channels. In some embodiments, at least two of the air channels share an air input port 96 and an air output port (not illustrated).

Figure 8A:
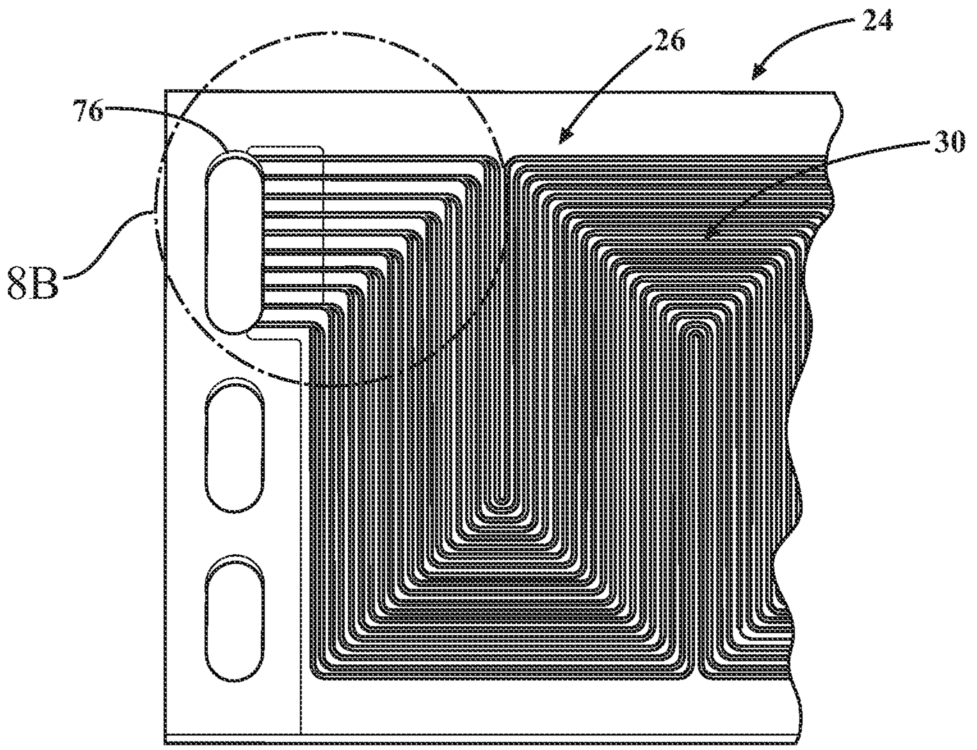
FIG. 8A is a perspective view of an air plate having a first air surface defining a plurality of air channels.
Figure 8B:
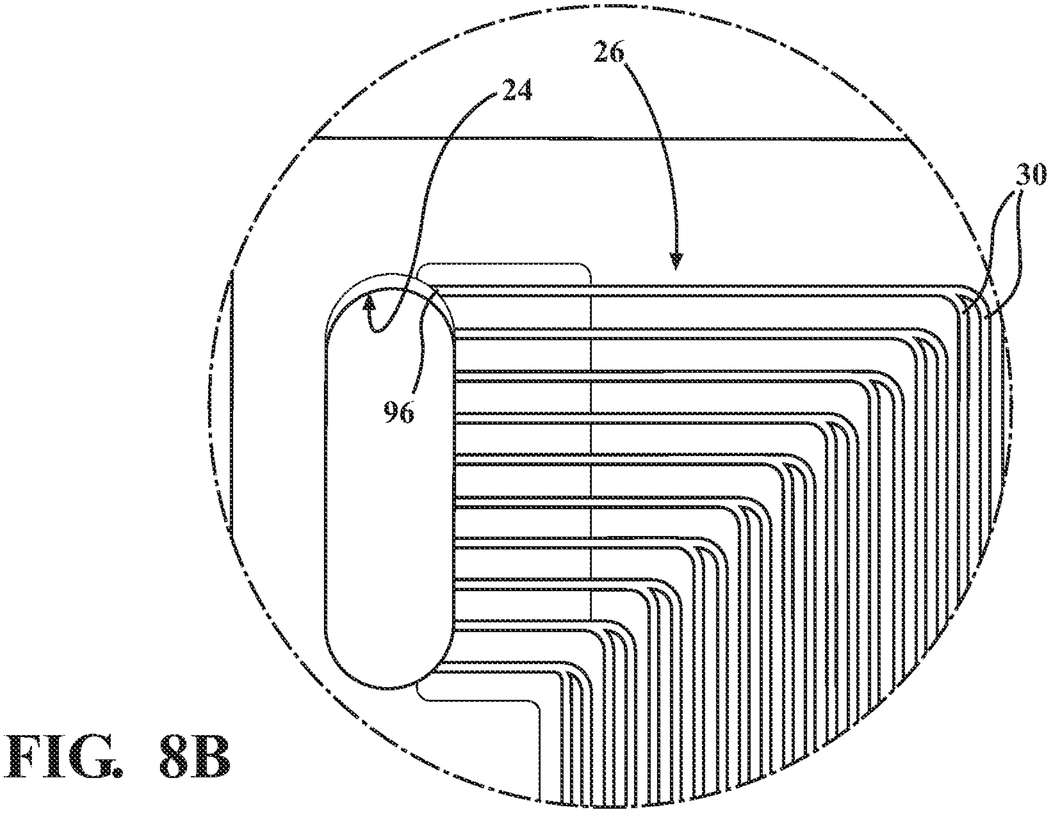
FIG. 8B is an enlarged view of the plurality of air channels of FIG. 8A illustrating ten of an air input port that split to feed twenty air channels.

Referring now to FIGS. 8A and 8B, an embodiment of an air plate 24 having a first air surface 26 defining a plurality of air channels 30 is illustrated. FIG. 8A is a perspective view of the first air surface 26 defining the plurality of air channels 30, the second air surface 28, which is flat, is opposite the first air surface 26. FIG. 8B is an enlarged view of the plurality of air channels 30 on the first air surface 26 illustrating ten of an air input port 96 that split to feed twenty air channels.

In some embodiments, the plurality of air channels 30 can have an air input port to air channel ratio from 1:1 to 1:4, or from 1:2 to 1:3. In the embodiment of FIGS. 8A and 8B, the plurality of air channels 30 has an air input port to air channel ratio of from 1:2, since each air input port splits into two air channels. As is illustrated in FIGS. 8A and 8B the primary air channel feeds eight of the air input port 96 which split to form sixteen air channels. In turn, at the other end of the plate, the sixteen air channels merge into eight of the air output port (not illustrated).

Each of the air channels have a depth and a width. In some embodiments, at least a portion of the air channels have an average width of from 0.75 to 3.25, from 1.25 to 2.75, from 1.5 to 2.0, or about 1.84 mm. In some embodiments, at least a portion of the air channels have an average channel depth of from 0.3 to 1.5, from 0.6 to 1.2, from 0.8 to 1.0, or about 0.9 mm. With continued reference now to FIGS. 8A and 8B, in some embodiments, the plurality of air channels 30 has a serpentine pattern. In some such embodiments, each of the plurality of air channels 30 have from 6 to 20 or from 8 to 12 180° turns. As you can see in FIGS. 8A and 8B, the embodiment illustrated has sixteen air channels defining a serpentine pattern, each of the air channels has ten 180° turns.

The cell stack 10 typically includes a first compression plate 12 (or first end plate) at the first end of the cell stack and a second compression plate 14 (or second end plate) at the second end of the cell stack 10. The first and second compression plates 12, 14 work in conjunction with a plurality of fasteners 100 to compress and fluidically and hermetically seal the cell stack. The efficiency of the cell stack 10 is impacted by uniform cell-to-cell compression over the entire MEA 34 surface. As such, uniform and consistent stack compression provides uniform cell-to-cell compression over the entire MEA 34 surface. Various embodiments of the cell stack 10 include a plurality of pressurization channels 102 disposed about a perimeter of the cell stack 10. The plurality of fasteners 100 can be used to compress the cell stack 10 during the process of assembly, and afterwards during use. In a typical embodiment, the plurality of fasteners are "dynamic fasteners" and referred to as such. In such embodiments, the plurality fasteners are referred to as dynamic because each of the dynamic fasteners have a pre-defined force-deflection relationship. As such, the cell stack 10 is compressed to a fixed pre-determined displacement that compresses the dynamic fasteners to a known applied cell stack 10 compression force. Due to the known force-deflection relationship, the applied stress over each reaction cell 32 and on the surface area of the MEA 34 is known in advance. As such the plurality of fasteners 100 ensure uniform compression according to a known "stress" to the MEA 34.

In some embodiments, the plurality of pressurization channels 102 is further defined as from 6 to 17 or from 13 to 15 channels and the plurality of fasteners 100 is further defined as from 6 to 17 or 13-15 dynamic fasteners. In some such embodiments, each of the plurality of fasteners 100 has a different the force-deflection relationship or force-displacement curve. Each of the plurality of dynamic fasteners has a non-linear force-deflection relationship or force-displacement curve. To quantify the force-deflection relationship or the force-displacement curve, a single washer (biasing element) is placed between hardened, ground platens and compressed in a test machine and load vs. displacement is recorded up to (but not past) flattening to reveal friction/hysteresis if you cycle the load. If washers are stacked in parallel (same orientation), the forces add, deflection is that of one washer divided by the number in parallel. If washers are stacked in series (alternating), deflections add, force is that of one washer. Friction between washers can change the effective curve under cycling. As such, the stack can be placed between hardened, ground platens and compressed in the test machine to determine the force-deflection relationship or force-displacement curve.

Figure 3B:
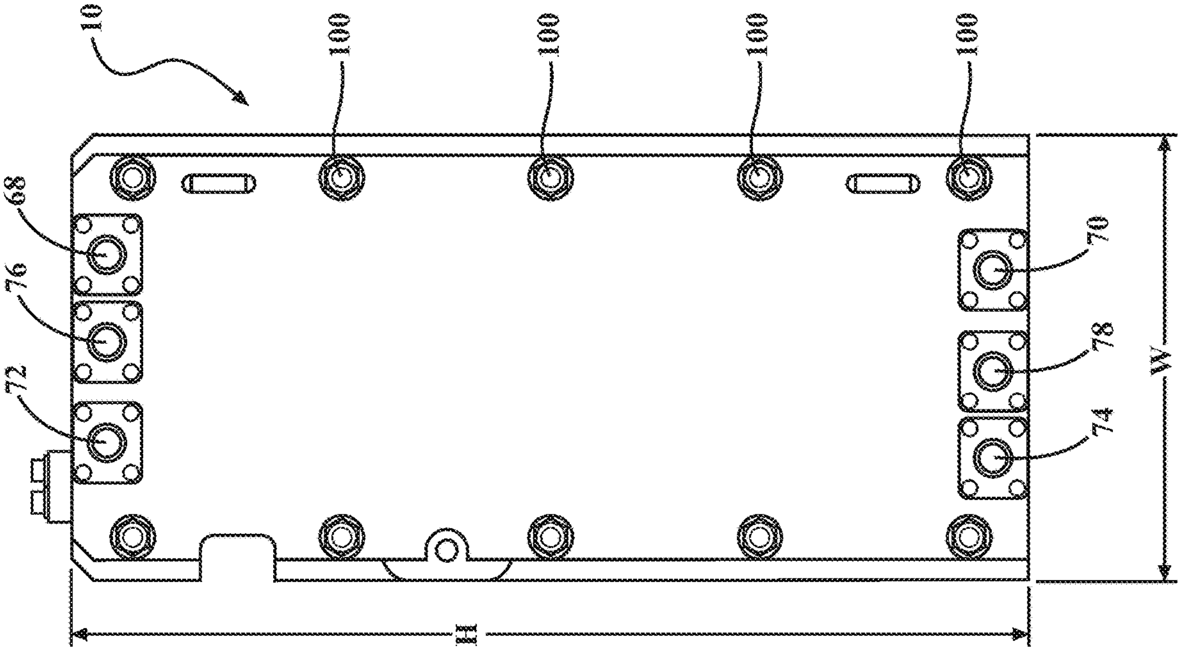
FIG. 3B is a top view of the fuel cell stack of FIG. 1.
Figure 3A:
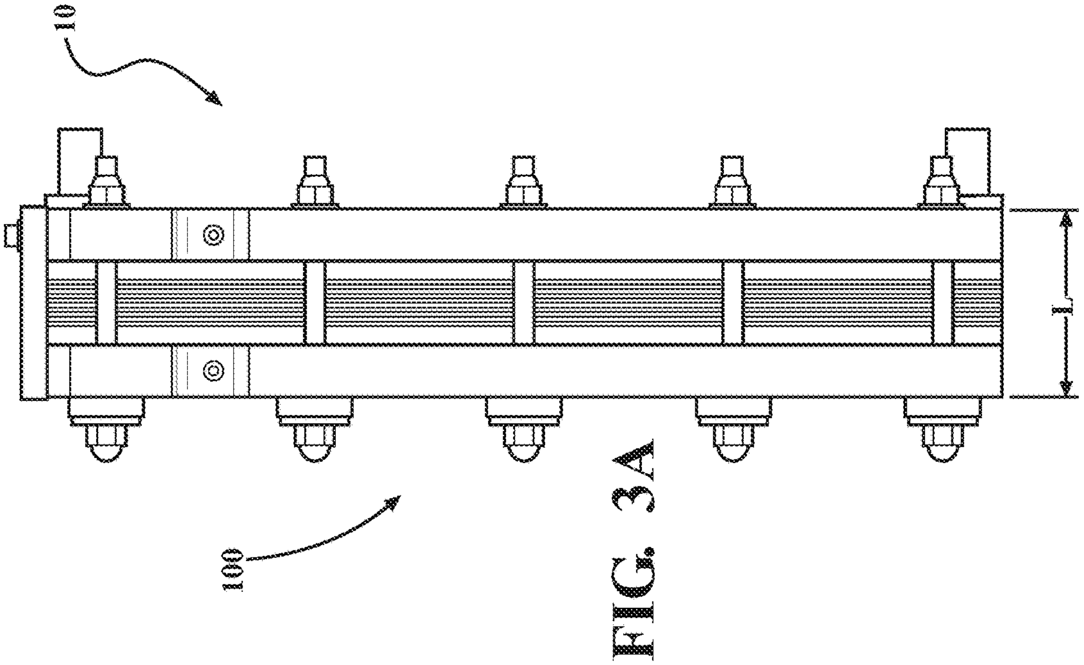
FIG. 3A is a side view of the fuel cell stack of FIG. 1.

With reference now to FIGS. 1 and 2, the cell stack 10 of the embodiment illustrated includes 8 pressurization channels. In one embodiment, the cell stack 10 comprises ten of the plurality of pressurization channels 102 and ten of the plurality of fasteners 100. In some such embodiments, each of the ten of the plurality of fasteners 100 has a different force-deflection relationship or force-displacement curve. With reference now to FIGS. 3A and 3B, a corresponding plurality of dynamic fasteners is disposed in the plurality of pressurization channels to compress the cell stack 10. As is illustrated, the cell stack 10 has a length L, a width W, and a height H. The embodiment illustrated in FIGS. 1-3B is just one of many contemplated in this disclosure. The length L, width W, height H, and other dimensions illustrated can vary, depending on the embodiment. For example, the embodiments of the cell stack 10 having more reaction cells will be longer. In some embodiments, tightening the plurality of dynamic fasteners provides a compression displacement (ΔL) of a length L of the cell stack 10 of from 3 to 30, from 6 to 16, from 7 to 14, or from 8 to 12 mm.

In one embodiment, the cell stack 10 provides even distribution of reactants over both sides of the polymeric membrane so that the entire surface area of MEA 34 is used. This requires a compressive pressure between the surface of the MEA 34 and the flow channels of the air surface of a fuel-air bipolar plate 40. The desired compressive pressure or surface pressure is, in many embodiments, from 80 to 120 or from 100 to 110 psi. The desired compressive pressure or surface pressure is, in many embodiments, from 80 to 120 or from 100 to 110 psig. If the compressive pressure is too low, the air flow will short circuit the flow channels and not maximize the area involved in the chemical reaction in the MEA 34. If the compressive pressure is too high, the MEA 34 will be damaged and experience delamination, possibly even damaging fuel/air cross-flow.

As such, achieving a precise compressive pressure and thus a MEA surface pressure requires knowing the linear compression height reduction of the fuel cell stack assembly as a reaction to applied, known external force. This is the purpose of the dynamic fastener 104. In one embodiment, the cell stack 10 comprises ten of the plurality of pressurization channels 102 and ten of the plurality of dynamic fasteners 104. In some such embodiments, each of the ten of the plurality of fasteners 100 has a different force-deflection relationship or force-displacement curve. In some preferred embodiments, each washer model number has a different Force-displacement curve. A force displacement curve model is set forth below:

$$F(\Delta)[\mathrm{N}] = 686.53\ [\mathrm{N}] + 3159.38\left[\frac{\mathrm{N}}{\mathrm{mm}}\right]\cdot\Delta[\mathrm{mm}]$$

Δ is the compression of the fuel cell stack. The force equation provides the compression force (units is Newtons) as a function of Δ (units in mm).

A force-displacement analysis for the fuel cell having ten tie rods and fifteen washers (biasing elements) and a duty % of 50:

| N | mm | N | mm | Force vs. Deflection | |
|---|---|---|---|---|---|
| F1 | D1 | F2 | D2 | slope | Y-int. |
| 2631 | 0.53 | 3372 | 0.85 | 3159.375 | 686.5313 |

| mm | | | | | | Seals | |
|---|---|---|---|---|---|---|---|
| Def Max | mm Total | N/washer Force | kN Total | Lbf Total | Tons Total | kPa Pressure | Psig Pressure |
| 0.425 | 6.375 | 2029.266 | 30.44 | 6842.96 | 3.42 | 691.7951 | 100.6596 |

Figure 16:
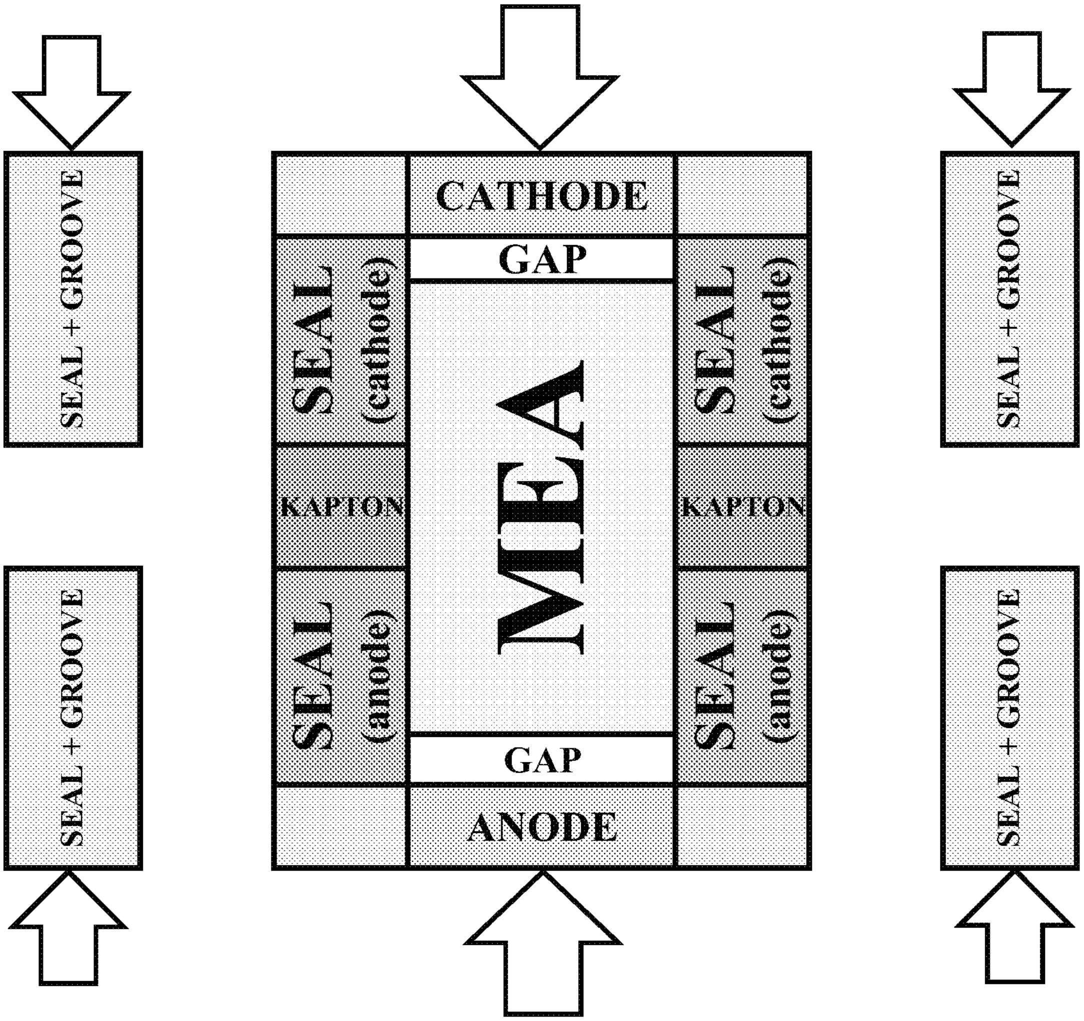
FIG. 16 is a schematic diagram illustrating a seal MEA and plate model.

In the example above, the measured deflection is 6.375 mm and the MEA surface pressure is 100.6596. FIG. 16 is a schematic diagram illustrating a seal, MEA, and plate model. The purpose of the matrix is to explain the different parameters that are considered when calculating the fuel cell membrane pressure. Knowing the FORCE-Displacement curve for the washers and "measuring" the displacement (i.e. Delta) upon assembling, allows us to compute compression FORCE. Knowing the FORCE and the compression AREA, allows us to calculate MEA pressure, i.e. Pressure=FORCE/AREA. In the example of FIG. 16, the stack is compressed within a 20 TON hydraulic press, while measuring the vertical compression ("delta") of the stack.

More specifically, FIG. 16 is a schematic diagram illustrating the anode and cathode seal, the MEA including the Kapton frame border, and the anode and cathode bipolar plates with seal grooves. The geometric seal balance equation is: $K+X1+X2-M=\delta\approx 0$, wherein:

K is the thickness of the Kapton frame border surrounding the MEA;

M is the thickness of the MEA;

X1 is the cathode groove seal height above the plate;

X2 is the anode seal thickness above the plate;

Depending upon the manufacturing seal tolerances, the right-hand side "must" be nearly zero for effective planar compression across the surface of the MEA. Further, with reference to FIG. 16 and the data above:

H is the cathode total seal height;

D is the cathode groove depth; and thus,

X1 is the cathode groove seal height above the plate surface;

$X1=H-D$; but, $K+X1+X2-M=0$, so $H\sim D+M-M-K-X2$

This provides the unique expression that define the "required" cathode seal thickness (H) to optimize cathode planar compression (manufacturing seal tolerances must be considered). The equations above allow computation of the required stack vertical compression and the required seal total thickness compatible with seal groove depth, MEA thickness and other cell geometric parameters to optimize the MEA recommended uniform pressure, and, to ensure the uniform distribution of oxygen and fuel across the surface of the MEA. This calculation process is appliable to ALL PEM hydrogen fuel cell stacks to optimize delivery of reactants and to optimize stack performance.

In a typical embodiment, each dynamic fastener 104 comprises a tie rod 106 having a first and a second end, a sleeve 108, at least one of a mount 110, a biasing element 112, and an endpiece 116. In some embodiments, each of the plurality of dynamic fasteners comprise: a first mount, a first biasing element, and a first endpiece configured for engagement with the first end; and a second mount, a second biasing element, and a second endpiece configured for engagement with the second end.

Figure 4A:
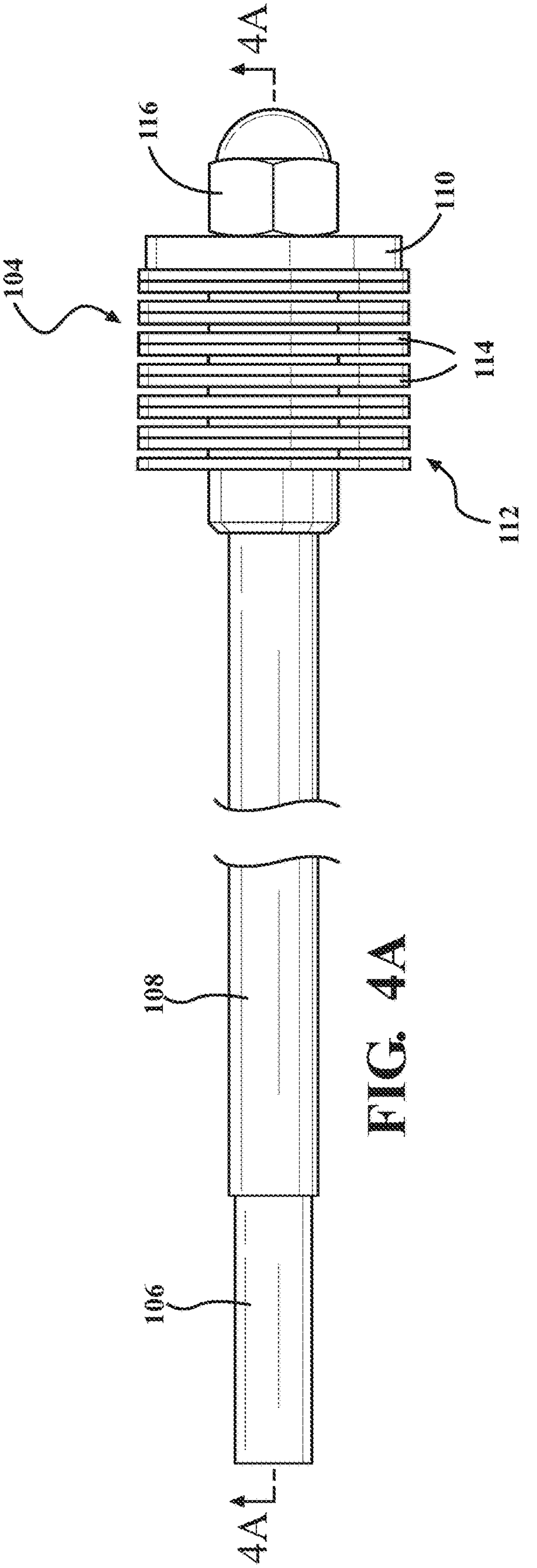
FIG. 4A is a side view of an embodiment of a dynamic fastener comprising a tie rod having a first and a second end, at least one of a mount, a biasing element, and an endpiece.
Figure 4B:
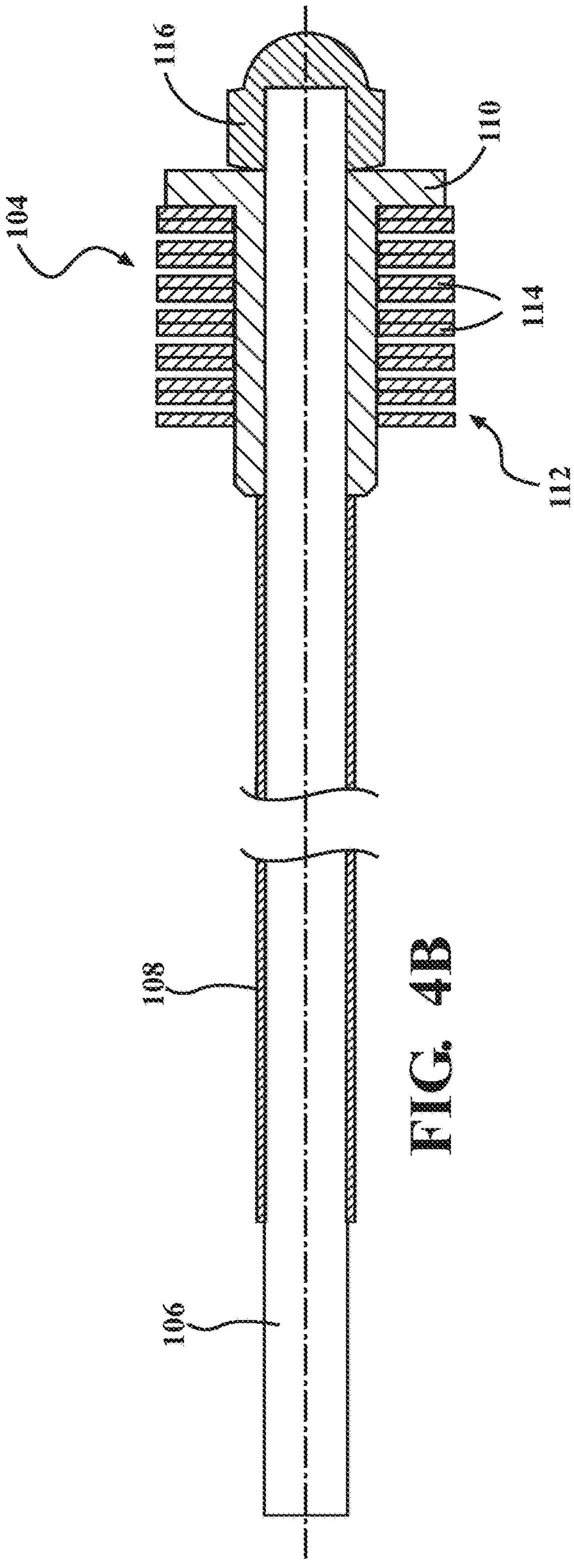
FIG. 4B is a cross-sectional view of FIG. 4A along A-A.

Referring now to FIGS. 1, 4A and 4B, an embodiment of the dynamic fastener 104 is illustrated. The first and the second end of the tie rod 106 are threaded. The sleeve 108 typically comprises a lubricious polymer such as polytetrafluoroethylene. The mount 110 or alignment sleeve is disposed about the sleeve 108 is disposed on the first end of the tie rod 106. The biasing element 112 is disposed about the mount 110. In this example, the biasing element comprises a plurality of washers 114. Each of the plurality of washers 114 is a conical-shaped disc, resembling a washer having a conical shape. Each washer (also referred to as a spring washer or disc spring) works by providing a high load over a small deflection range. When a load or force is applied to each washer, it flattens out, creating resistance. This resistance is due to the washer's elasticity and conical shape, which provides a spring-like action. As each washer is compressed, it distributes the load over a wide area, reducing stress on any single point. The spring force generated by each washer can be adjusted based on its thickness, diameter, and the material used. From a design perspective, the plurality of washers 114 (of the biasing element 112) can be stacked in different configurations (e.g., parallel or series) to either increase the load capacity or adjust the deflection range. Parallel stacking (same orientation) increases the load without changing the deflection range. Series stacking (alternating orientation) increases the deflection range while keeping the same load capacity. In some embodiments, each of the plurality of dynamic fasteners have a force-deflection relationship of from 50 to 170 or from 90 to 150 psi.

Still referring to FIGS. 1, 2, 4A and 4B, an endpiece 116 is threadedly engaged with the first end of the dynamic fastener, which can be turned, i.e., tightened to compress the biasing element and compress the cell stack 10. Displacement of the biasing element of each of the dynamic fasteners is independent of the number of cells within the cell stack 10, and thus ensures a consistent assembly process and uniform operating conditions independent of thermal conditions. In some embodiments, a surface pressure of from 80 to 120 or from 100 to 110 psi is maintained on the two or more of the reaction cell 32. The plurality of dynamic fasteners maintain a consistent preload in bolted joints, compensating for thermal expansion, relaxation, or other factors associated with the operation of the cell stack 10. Plus, the plurality of dynamic fasteners, particularly the biasing element 112 comprising the plurality of washers 114, absorbs shock and vibration.

Referring now to FIG. 1, a second end assembly is configured for engagement with the second, threaded end of the tie rod 106. The second end assembly includes a washer 122 and an end nut 124 having a threaded interior surface, which engages the second threaded end of the tie rod 106.

Figure 12:
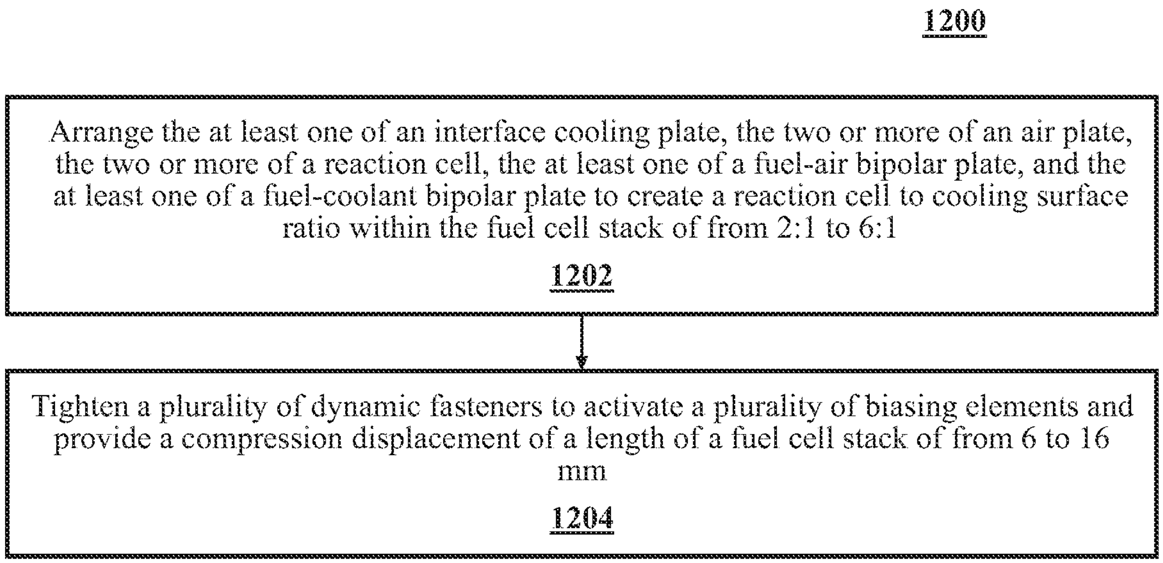
FIG. 12 is a flow chart describing an embodiment of a method of assembling a fuel cell stack.

Referring now to FIG. 12, a method (1200) of assembling the cell stack 10 is disclosed. The method includes the step of arranging the two of an interface plate, the two or more of the air plate 24, the two or more of the reaction cell 32, the at least one of the plurality of air channels 30, and the at least one of the fuel-coolant bipolar plate 48 to create a reaction cell to cooling surface ratio within the cell stack of from 2:1 to 6:1 (1202). The method also includes the step of tightening the plurality of dynamic fasteners to activate a plurality of biasing elements and provide a compression displacement of a length of the cell stack of from 6 to 16 mm (1204).

Generally, hydrogen electrons are consumed in the chemical reaction that occurs in the reaction cells 32 of the cell stack 10 during power generation with the cell stack 10. As such, the chemical reaction (e.g., electrochemical conversion process) results in a hydrogen pressure differential between the fuel inlet port and the fuel outlet port. In other words, a decrease in hydrogen pressure occurs along the hydrogen fluid pathway between the fuel inlet port and the fuel outlet port. As such, high power density fuel cell stacks of the prior art require 10-20% by weight more hydrogen fuel than is required to meet the current load demand, which is often calculated based upon the desired electrical current load demand. As such, fuel (e.g., hydrogen) is wasted with decreased fuel efficiency.

The hydrogen fluid pathway includes the at least one fuel inlet port and the at least one fuel outlet port. In a typical embodiment of the cell stack 10 the first compression plate 12 defines the fuel inlet port that is in fluid communication with an anode side of the cell stack 10 and the second compression plate 14 defines the fuel outlet port. In most embodiments, a hydrogen mass flow controller in fluidic communication with the anode side of the cell stack 10 and configured to provide hydrogen at a hydrogen flow rate. In some such embodiments, a digital differential pressure regulator in fluidic communication with the fuel inlet port and the fuel outlet port and in electronic communication with the hydrogen mass flow controller. Said differently, a digital differential pressure regulator is connected to the hydrogen flow path and is configured to measure a pressure at an upstream point at or near where hydrogen enters the hydrogen flow path, and also measure a pressure at a downstream point at or near where hydrogen exits the flow path. As such, excess fuel (e.g., hydrogen) does not have to be provided to the cell stack 10 of the subject disclosure, resulting in increased fuel efficiency.

Figure 14:
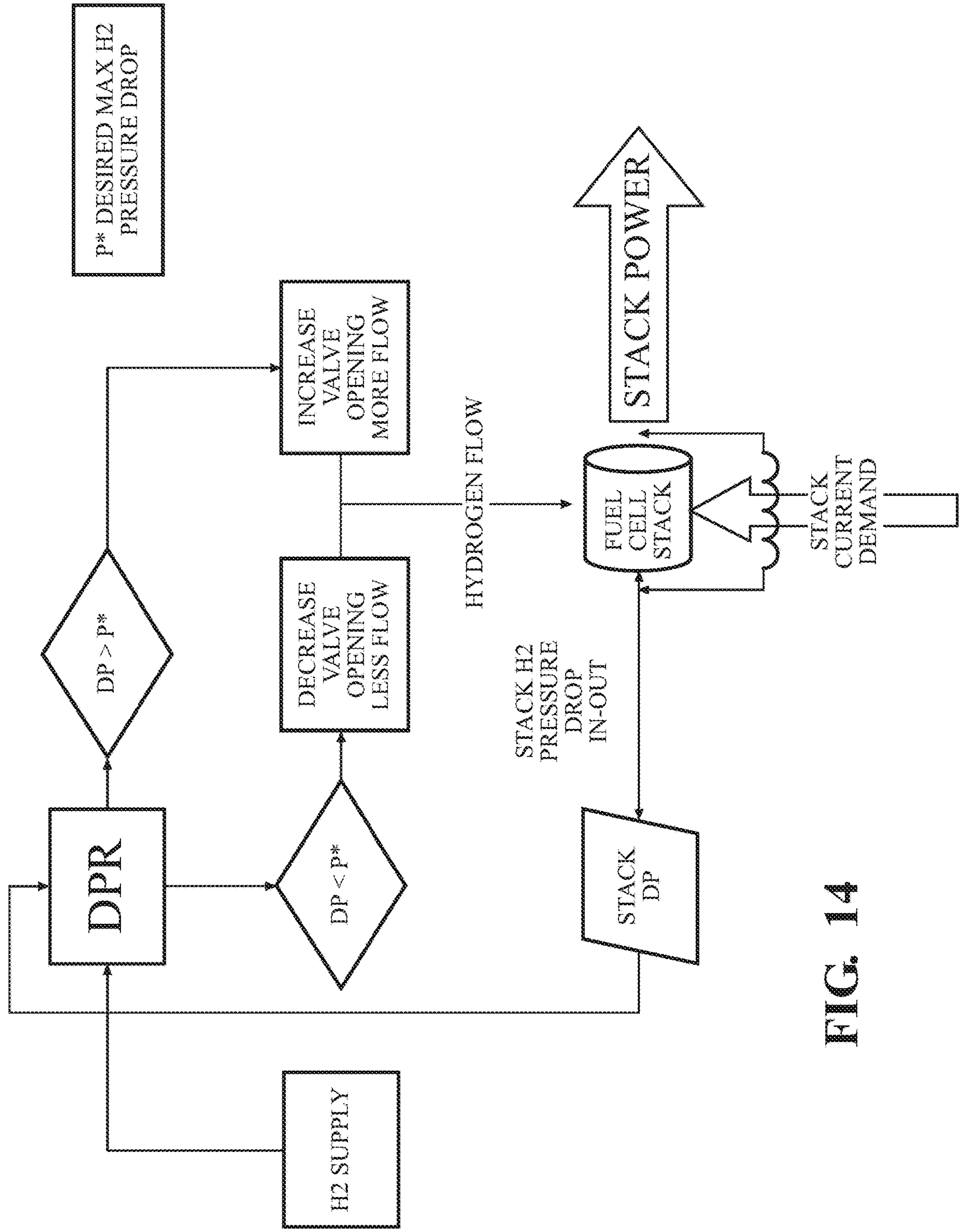
FIG. 14 is a schematic diagram illustrating an embodiment of a method of generating power with a fuel cell stack.
Figure 15:
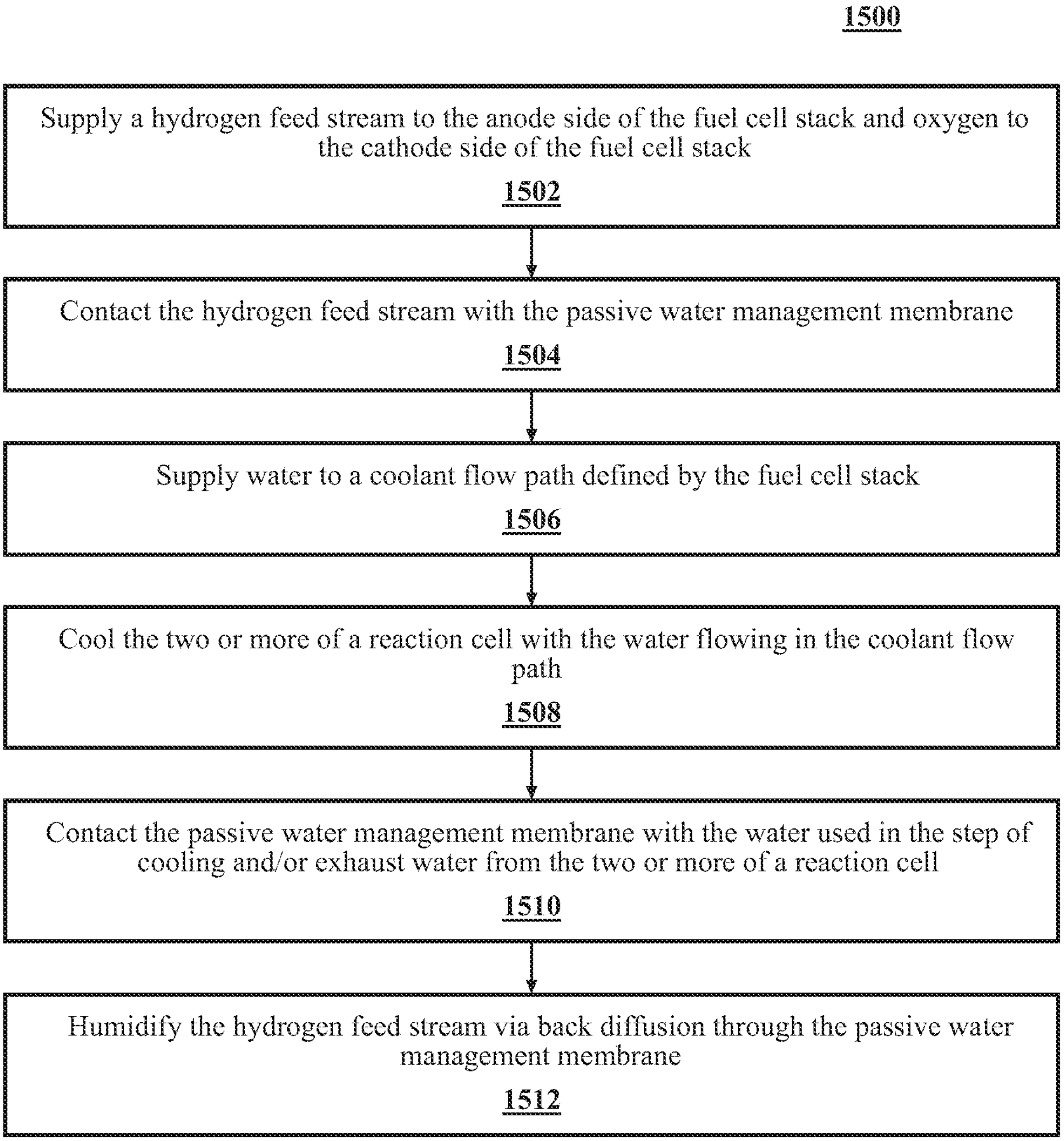
FIG. 15 is a flow chart describing an embodiment of a method of humidifying a hydrogen feed stream while generating power with a fuel cell stack.

With reference to FIGS. 14 and 15, the digital differential pressure regulator senses a pressure differential between the fuel inlet port and the fuel outlet port on the anode side and adjusts the hydrogen flow rate to maintain a target pressure differential to improve fuel usage efficiency independent of a current load of the cell stack 10.

Figure 13:
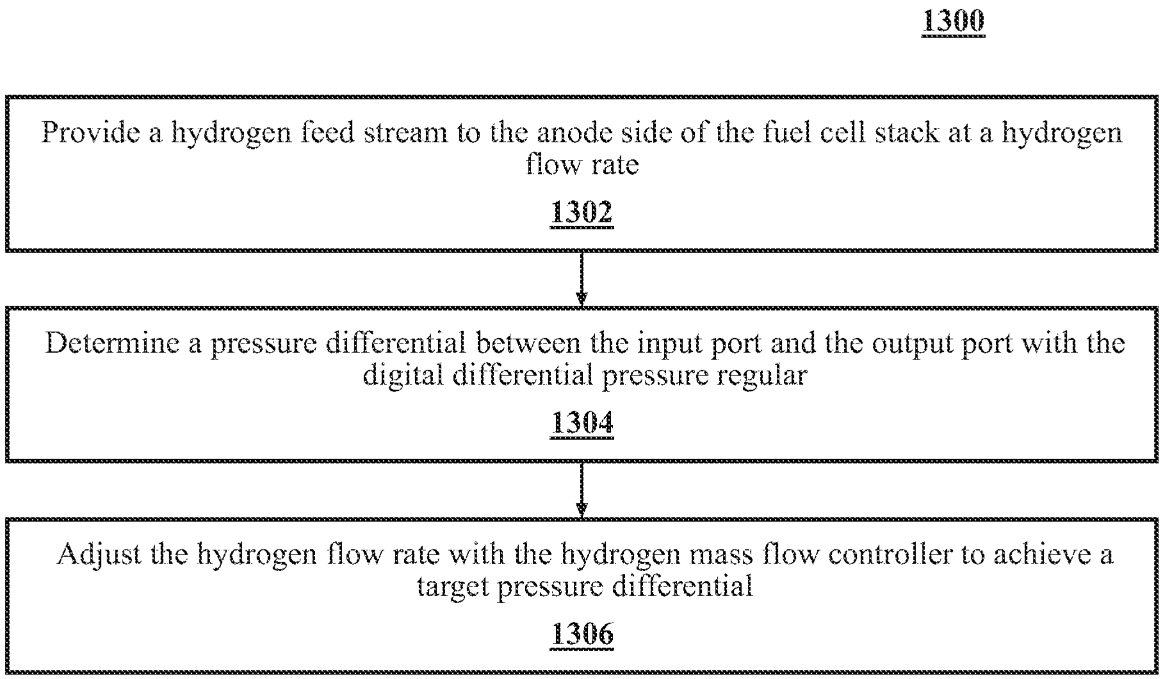
FIG. 13 is a flow chart describing an embodiment of a method of generating power with a fuel cell stack.

With reference to FIG. 13, a method of generating power with the cell stack 10 having the anode side and the cathode side is disclosed. The cell stack 10 of this embodiment includes the hydrogen mass flow controller in fluidic communication with a fuel inlet port on the anode side as well as the digital differential pressure regulator in fluidic communication with both the fuel inlet port and a fuel outlet port on the anode side. The digital differential pressure regulator is in electronic communication (wired or wireless) with the hydrogen mass flow controller. The method 1300 comprises the steps of: providing a hydrogen feed stream to the anode side of the cell stack 10 at a hydrogen flow rate (1302); determining a pressure differential between the fuel inlet port and the fuel outlet port with the digital differential pressure regulator (1304); and adjusting the hydrogen flow rate with the hydrogen mass flow controller to achieve a target pressure differential (1306). In a typical embodiment the steps of determining (1304) and/or adjusting (1306), are conducted a frequency of greater than once per second, per 0.1 second, per 0.01 second, per 0.001 second, or about every millisecond (0.001 second). FIG. 14 is a schematic diagram illustrating an embodiment of the method (1300) of generating power with the cell stack 10.

In some embodiments, the cell stack 10 operates with less than 10, 9, 8, 7, 6, 5, 4, 3, 2, 1% by weight fuel efficiency based on calculated based upon the desired electrical current load demand. In other embodiments, the cell stack 10 operates on the calculated hydrogen requirements based upon the desired electrical current load demand with about 100% fuel efficiency.

The electrical conversion efficiency of the cell stack 10 is dependent on the water content (i.e., the humidification) of the fuel (hydrogen) feed stream. If a water content of the fuel feed stream is too low (i.e., the fuel feed stream is too dry), the MEA 34 becomes brittle and with a resulting increased electrical resistance, decreased power, and possible 'pin holes' that allow uncontrolled direct mixing of hydrogen and oxygen molecules and possible fires over time. If a water content of the fuel feed stream is too high (i.e., the fuel feed stream is too wet), 'flooding' of the MEA 34 occurs and reduces the electron flow (i.e., electrical conductivity) on the electrical pathway of the cell stack 10.

In some embodiments, the cell stack 10 includes the passive water management membrane 66. The passive water management membrane 66 is a standalone invention and can be used with various configurations of the cell stack 10 including cell stacks described herein and also fuel cell stacks that are not described herein. The passive water management membrane 66 functions to:

(1) heat the incoming hydrogen feed stream fueling the cell stack 10; and
(2) humidify the incoming hydrogen feed stream fueling the cell stack 10.

The passive water management membrane 66 is designed to allow for penetration of water and heat (via mass and heat transfer) from water output stream (previously used to cool the plurality of reaction cells 32) into the incoming hydrogen feed stream. More specifically, the heat and water molecules penetrate the passive water management membrane 66 in a process called mass or back diffusion through the passive water management membrane 66. The rate of mass and heat transfer to humidify the incoming hydrogen feed stream is impacted by a compositional makeup, porosity and thickness of the passive water management membrane 66 as well as various environmental parameters including, but not limited to, a relative humidity and temperature of the hydrogen feed stream, a temperature of the water output stream, and pressure and temperature differences across the passive water management membrane 66.

The passive water management membrane 66 uses the energy and water output of the cell stack 10 to humidify the fuel feed stream (hydrogen feed stream), which results in increased electrical efficiency. In some embodiments, the passive water management membrane 66 increases a relative humidity of the fuel feed stream by 10, 20, 30, 40, 50, 60, 70, 80, 90, 100, 150, 200, 250, 300, 350, or 400% based on the relative humidity of the feed stream prior to humidification by back diffusion.

Figure 9A:
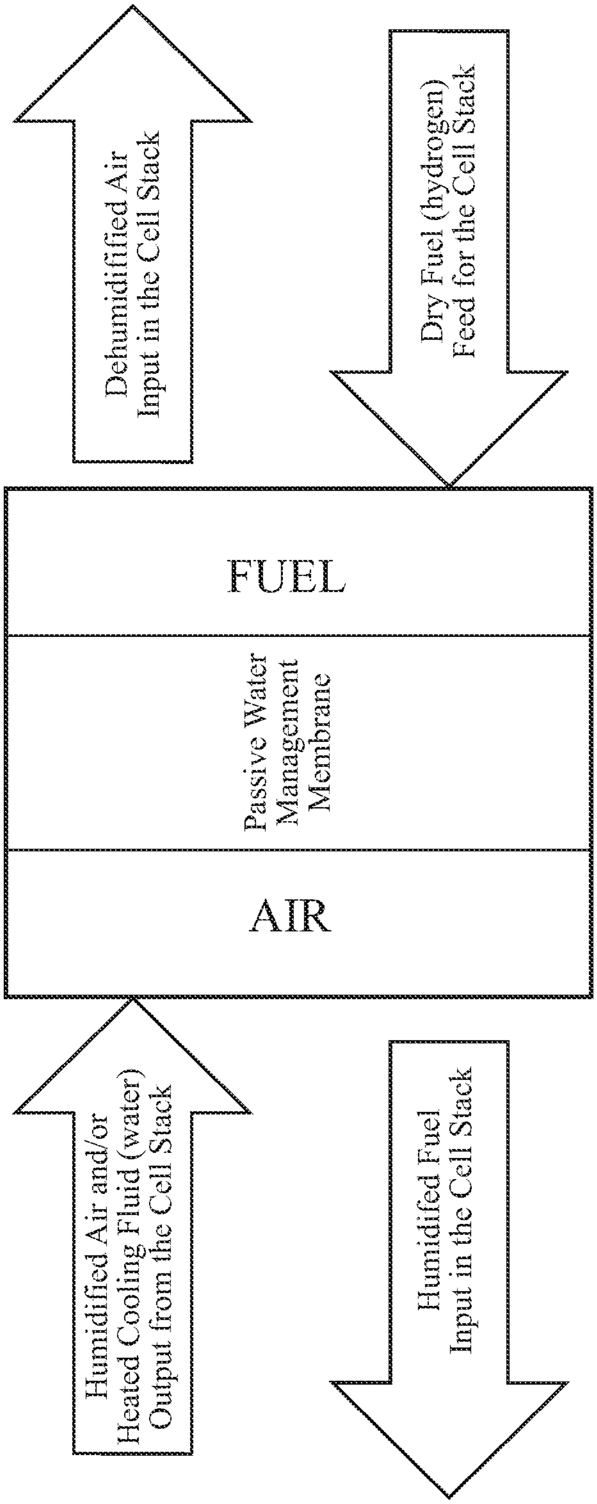
FIG. 9A is a schematic diagram illustrating how a passive water membrane humidifies hydrogen fuel for use in the cell stack via back diffusion.

FIG. 9A is a schematic diagram illustrating how the passive water management membrane 66 humidifies hydrogen fuel for use in the cell stack 10 via back diffusion. During operation of the cell stack 10 the anode side of the MEA 34 may contain hydrogen having a relative humidity of from 0 to 50, or from 10 to 30% and a temperature of from 15-35, about 18, 19, 20, 21, 22, 23, 24, 25, 26, 27, 28, 29, 30, 31, or 32° C. and the cathode side of the MEA 34 may contain moist cathode exhaust air having a 100% relative humidity and a temperature of about 70° C.

Through the process of back-diffusion through the passive water management membrane 66 the incoming fuel/hydrogen feed stream receives both thermal energy to provide a temperature increase and water molecules to provide a relative humidity increase. As such, the passive water management membrane 66 is used to heat and humidify the hydrogen feed stream entering the cell stack 10.

As is described above, an air-water exhaust mixture exits the cell stack 10 through an air outlet port. The air-water exhaust mixture typically exits the cell stack 10 at a temperature of from 50 to 90 or from 55 to 80° C. The air-water exhaust mixture includes both energy and water generated in the exothermic chemical reaction that takes place in the reaction cells. As is also described above, cooling water is circulated through the plurality of cooling channels 22 the cooling water absorbs energy generated in the exothermic chemical reaction that takes place in the reaction cells. Once circulated, the cooling fluid (e.g., water) discharged from the cell stack 10 is thus hot and can even include a mix of water and steam. The air/water exhaust from the cathode side of the cell stack 10 or the discharged water penetrates the passive water management membrane 66 to humidify hydrogen fuel supply of the anode side of the cell stack 10. The exhaust air may be dehumidified in the process and reused in anode side of the cell stack 10. With reference again to FIG. 9A, the processes of dehumidifying air and humidifying fuel are illustrated.

Figure 9B:
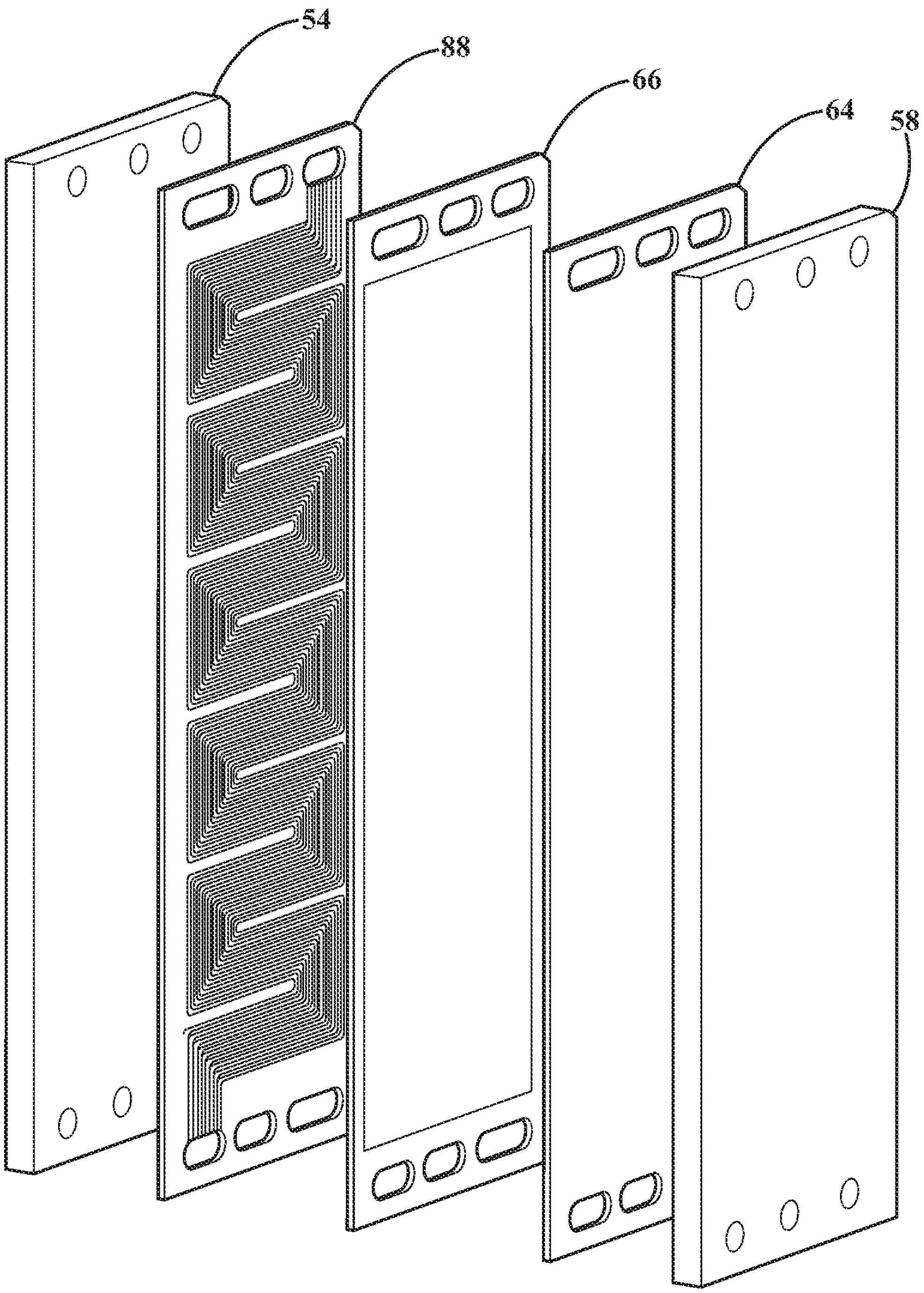
FIG. 9B is an exploded side perspective view of an embodiment of an arrangement of plates including a passive water management membrane that can be used to humidify hydrogen fuel via back diffusion.

The passive water management membrane 66 provides a path for heat and mass (e.g., $H_2O$ molecules). In a typical embodiment, the passive water management membrane 66 is located between: (1) a cathode exhaust flow passageway or a cooling fluid discharge passageway; and (2) a hydrogen supply passageway. FIG. 9B is an exploded side perspective view of a portion of an embodiment of a plurality of plates including the passive water management membrane 66 that can be used to humidify the hydrogen feed stream via back diffusion. In this embodiment, the passive water management membrane 66 includes a frame comprising a rigid material, e.g., a metal that surrounds a polymeric membrane, e.g., a sulfonated tetrafluoroethylene-based fluoropolymer-copolymer membrane. In a typical embodiment, the membrane is either mechanically engaged with and/or adhesively bonded to the frame.

A rate of mass and heat transfer to humidify the incoming hydrogen feed stream can be adjusted by changing a compositional makeup, porosity, and thickness of the passive water management membrane 66. In some embodiments, the passive water management membrane 66 comprises a sulfonated tetrafluoroethylene-based fluoropolymer-copolymer. The passive water management membrane 66 has a surface area of from 250 to 650, from 300 to 600, from 350 to 550, or about 440 $cm^3$. The thickness of the passive water management membrane 66 can be varied to change the rate of diffusion (alternatively the rate of back diffusion). That said, in some embodiments, the passive water management membrane 66 can have a thickness of from 4 to 100, from 10 to 75, from 20 to 60, from 30 to 60, or from 40 to 60 mm.

In some embodiments, the passive water management membrane 66 is porous. The passive water management membrane 66 can comprise open poor (or cells), closed pores (or cells), or a combination of closed and open pores (cells). Closed porosity, the overall volume of closed pores contained within a material, is estimated by comparing true density results with expectations. Pore size can be determined via gas adsorption, mercury intrusion, or capillary flow porometry. In some embodiments, the passive water management membrane 66 can have an average pore size of from 0.35 nm to over 100 nm. In some embodiments, the passive water management membrane 66 comprises micropores having an internal width of less than 2 nm. In other embodiments, the passive water management membrane 66 comprises having an internal width of from 2 to 50 nm.

As is also set forth above, a rate of mass and heat transfer to humidify the incoming hydrogen feed stream is impacted by a relative humidity and temperature of the hydrogen feed stream, a temperature of the water output stream or air output stream, and pressure and temperature differences across the passive water management membrane 66. For example, when hydrogen in the hydrogen portion of the humidification cavity has a temperature of 30° C. and water in the water portion of the humidification cavity has a temperature of 60° C., the hydrogen portion of the humidification cavity has a hydrogen pressure of about 5 PSIG and the water portion of the humidification has a water pressure of about 7 PSIG. This differential can impact the mass and heat transfer rates within the humidification chamber and can be used to help design the passive water management membrane 66 having a certain thickness and porosity to allow for the mass and heat transfer at a specific rate.

In many embodiments, the sequence of plates including the passive water management membrane 66 can be included at either end of the stack, before the coolant flows into the cell stack. These embodiments may require a third, additional isolation plate. In the embodiment illustrated in FIG. 9B, the plurality of plates include:

- the first isolation plate 54;
- the fuel plate 88 having a first side that is flat and a second side defining a plurality of fuel channels 46;
- the passive water management membrane 66;
- the cooling plate 64 having the cooling plate surface defining a plurality of cooling channels 22 and flat surface opposite said cooling plate surface;
- the second isolation plate 58.

It should be appreciated that FIG. 9B is just a portion of an embodiment of the cell stack 10 and that a plurality of ensuing plates (not illustrated) are arranged to generate power with the humidified fuel (hydrogen). It should be appreciated that the above example can be repeated, such that 1, 2, 3, 4, or more of the passive water management membrane (and sequence of surrounding plates) can be used to humidify an incoming fuel stream in various embodiments of the cell stack 10 disclosed herein.

In this non-limiting embodiment, the second side of the fuel plate (defining the plurality of fuel channels carrying incoming hydrogen) and the first cooling side of the cooling plate (defining a plurality define a humidification cavity. The passive water management membrane 66 extends through the humidification cavity. The second fuel side of the fuel plate and a first surface of the passive water management membrane 66 define a hydrogen portion of the humidification cavity. The second surface of passive water management membrane 66 and the first cooling side of the cooling plate define a water portion of the humidification cavity. Adjacent the second fuel side of the fuel plate incoming fuel (hydrogen) is circulated through the plurality of fuel channels 46 that partially define the hydrogen portion of the humidification cavity. Adjacent the first cooling side of the cooling plate cooling water, previously circulated within the cell stack 10, is circulated through the plurality of cooling channels 22 that partially define the water portion of the humidification cavity. In the humidification cavity, the passive water management membrane 66 provides controlled transfer of heat and water molecules from the water portion of the passive water management membrane 66 to the hydrogen portion of the humidification cavity thus humidifying and heating the hydrogen entering the cell stack 10.

Referring now to FIG. 15, a method of humidifying a hydrogen feed stream while generating power with a fuel cell stack, including, but not limited to the cell stack 10 described and disclosed herein. In one embodiment, the cell stack 10 is as described above and includes the two of an interface plate 16, 18, the two or more of the air plate 24, the two or more of a reaction cell 32, an air channel (e.g., the at least one of the plurality of air channels 30), the at least one of the fuel-coolant bipolar plate 48, and the passive water management membrane 66 comprising a sulfonated tetrafluoroethylene-based fluoropolymer-copolymer. The method (1500) comprises the steps of:

- supplying a hydrogen feed stream to the anode side of the cell stack and oxygen to the cathode side of the cell stack (1502);
- contacting the hydrogen feed stream with the passive water management membrane (1504);
- supplying water to a coolant flow path defined by the cell stack (1506);
- cooling the two or more of a reaction cell with the water flowing in the coolant flow path (1508);

contacting the passive water management membrane with the water used in and discharged from the step of cooling and/or exhaust air from the two or more of a reaction cell (1510); and humidifying the hydrogen feed stream via back diffusion through the passive water management membrane (1512).

The above description is that of current examples of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all examples of the disclosure or to limit the scope of the claims to the specific elements illustrated or described in connection with these examples. For example, and without limitation, any individual element(s) of the described disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed examples include a plurality of features that are described in concert and that might cooperatively provide a collection of benefits. The present disclosure is not limited to only those examples that include all these features or that provide all the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A fuel cell stack having an anode side and a cathode side, the fuel cell stack comprising:

two of an interface plate defining a first interface surface, a second interface surface, and a buss slot;

two or more of an air plate defining a first air surface and a second surface opposite the first air surface, wherein one of the first air surface or second surface defines a plurality of air channels, and the other, opposite surface is flat;

two or more of a reaction cell comprising a membrane electrode assembly disposed between a cathode seal and an anode seal;

at least one of a fuel-air bipolar plate having a first fuel-air surface and second fuel-air surface opposite said first fuel-air surface, wherein one of the first or second fuel-air surface defines a plurality of air channels, and the other, opposite surface defines a plurality of fuel channels; and at least one of a fuel-coolant bipolar plate having a cooling surface defining a plurality of cooling channels and a fuel surface defining a plurality of fuel channels opposite the cooling surface, wherein the two of an interface plate, the two or more of an air plate, the two or more of a reaction cell, the at least one of a fuel-air bipolar plate, and the at least one of a fuel-coolant bipolar plate are arranged to provide a reaction cell to cooling surface ratio within the fuel cell stack of from 1:1 to 10:1;

wherein the fuel cell stack includes:

at least one of a repeating plate sequence having a reaction cell to cooling surface ratio of 2:1 and comprising:

(a) the fuel-coolant bipolar plate, (b) one of the reaction cells, (c) the fuel-air bipolar plate, (d) an additional one of the reaction cells, and (e) one of the air plates; and at least one second plate sequence of a plurality of plates having a different reaction cell to cooling surface ratio than the reaction cell to cooling surface ratio of the repeating plate sequence;

wherein the fuel cell stack includes one or more instances of the repeating plate sequence disposed within the fuel cell stack;

wherein each cooling surface contributing to the reaction cell to cooling surface ratio is defined by a fuel-coolant bipolar plate disposed adjacent a flat surface of one of the air plates; and wherein the repeating plate sequence distributes cooling surfaces within the fuel cell stack relative to active reaction cells to manage temperature distribution across the fuel cell stack.

2. The fuel cell stack as set forth in claim 1, wherein the reaction cell to cooling surface ratio within the fuel cell stack is of from 2:1 to 6:1.

3. The fuel cell stack as set forth in claim 1, wherein the two or more of a reaction cell is further defined as from 30 to 90 of the reaction cell.

4. The fuel cell stack as set forth in claim 3 wherein, the reaction cell has a surface area of from 250 to 650 $cm^2$.

5. The fuel cell stack as set forth in claim 1, wherein:

a first compression plate defines a fuel inlet port in fluid communication with an anode side of the fuel cell stack; and a second compression plate defines a fuel outlet port.

6. The fuel cell stack as set forth in claim 5 further comprising:

a hydrogen mass flow controller in fluidic communication with the anode side and configured to provide hydrogen at a hydrogen flow rate; and a digital differential pressure regulator in fluidic communication with the fuel inlet port and the fuel outlet port and in electronic communication with the hydrogen mass flow controller;

wherein the digital differential pressure regulator senses a pressure differential between the fuel inlet port and the fuel outlet port on the anode side and adjusts the hydrogen flow rate to maintain a target pressure differential to improve fuel usage efficiency independent of a current load of the fuel cell stack.

7. The fuel cell stack as set forth in claim 1 having a plurality of pressurization channels disposed about a perimeter of the fuel cell stack and a plurality of dynamic fasteners disposed in the plurality of pressurization channels, each dynamic fastener comprising a tie rod having a first and a second end, at least one of a mount, a biasing element, and an endpiece.

8. The fuel cell stack as set forth in claim 7, wherein each of the plurality of dynamic fasteners comprise:

a first mount, a first biasing element, and a first endpiece configured for engagement with the first end; and a second mount, a second biasing element, and a second endpiece configured for engagement with the second end.

9. The fuel cell stack as set forth in claim 8, wherein a surface pressure of from 80 to 120 psi is maintained evenly across the two or more of the reaction cell, independent of the number of the two or more of the reaction cell in the fuel cell stack.

10. The fuel cell stack as set forth in claim 7, wherein the plurality of pressurization channels is further defined as from 6 to 17 channels and the plurality of dynamic fasteners is further defined as from 6 to 17.

11. The fuel cell stack as set forth in claim 7, wherein:

the plurality of dynamic fasteners provide a compression displacement of a length of the fuel cell stack of from 6 to 16 mm; and/or each of the plurality of dynamic fasteners have the same force-deflection relationship or force-displacement curve.

12. The fuel cell stack as set forth in claim 7, wherein a surface pressure of 80 to 120 psi is maintained on the two or more of a reaction cell.

13. The fuel cell stack as set forth in claim 1, wherein the plurality of cooling channels includes from 4 to 26 cooling channels.

14. The fuel cell stack as set forth in claim 13, wherein at least two of the cooling channels share a cooling input port and a cooling output port.

15. The fuel cell stack as set forth in claim 14, wherein a cooling input port to cooling channel ratio is from 1:1 to 1:4.

16. The fuel cell stack as set forth in claim 14, wherein a cooling input port to cooling channel ratio is from 1:2 to 1:3.

17. The fuel cell stack as set forth in claim 13, wherein at least a portion of the cooling channels have:

an average width of from 0.75 to 3.25 mm; and/or an average channel depth of from 0.3 to 1.5 mm.

18. The fuel cell stack as set forth in claim 17, wherein each of the cooling channels is partially defined by a cooling interface surface proximal the reaction cell, and a cooling interface surface to channel depth ratio is from 2:1 to 1:2.

19. The fuel cell stack as set forth in claim 13, wherein the plurality of cooling channels has a serpentine pattern.

20. The fuel cell stack as set forth in claim 19, wherein each of the plurality of cooling channels have from 3 to 12 180° turns.

21. The fuel cell stack as set forth in claim 1, further comprising a passive water management membrane, wherein:

cooling water circulated through the plurality of cooling channels defined by the cooling surface; and/or an exhaust mixture of water and air from the cathode side of the fuel cell stack, penetrates the passive water management membrane to humidify hydrogen fuel supply of the anode side of the fuel cell stack.

22. The fuel cell stack as set forth in claim 21, wherein the passive water management membrane comprises a sulfonated tetrafluoroethylene-based fluoropolymer-copolymer having a thickness of from 40 to 60 mm.

23. The fuel cell stack as set forth in claim 21, wherein the passive water management membrane is located between a cathode exhaust flow passageway and a hydrogen supply passageway.

24. A method of assembling a fuel cell stack as set forth in claim 1, said method comprising the steps of:

arranging the two of an interface plate, the two or more of an air plate, the two or more of a reaction cell, the at least one of a fuel-air bipolar plate, and the at least one of a fuel-coolant bipolar plate to create a reaction cell to cooling surface ratio within the fuel cell stack of from 2:1 to 6:1; and tightening a plurality of dynamic fasteners to activate a plurality of biasing elements and provide a compression displacement of a length of the fuel cell stack of from 6 to 16 mm.

25. A method of generating power with the fuel cell stack of claim 1 having an anode side and a cathode side and comprising a hydrogen mass flow controller in fluidic communication with a fuel inlet port on the anode side and a digital differential pressure regulator in fluidic communication with the fuel inlet port and a fuel outlet port on the anode side and in electronic communication with the hydrogen mass flow controller, said method comprising the steps of:

providing a hydrogen feed stream to the anode side of the fuel cell stack at a hydrogen flow rate;

determining a pressure differential between the fuel inlet port and the fuel outlet port with the digital differential pressure regulator; and adjusting the hydrogen flow rate with the hydrogen mass flow controller to achieve a target pressure differential.

26. The method of generating power set forth in claim 25, wherein the steps of determining and adjusting are conducted a frequency of greater than once per second.

27. A method of humidifying a hydrogen feed stream while generating power with the fuel cell stack of claim 1 having an anode side and a cathode side and comprising two of an interface plate, two or more of an air plate, two or more of a reaction cell, at least one of a fuel-air bipolar plate, at least one of a fuel-coolant bipolar plate, and a passive water management membrane comprising a sulfonated tetrafluoroethylene-based fluoropolymer-copolymer, the method comprising:

supplying a hydrogen feed stream to the anode side of the fuel cell stack and oxygen to the cathode side of the fuel cell stack;

contacting the hydrogen feed stream with the passive water management membrane;

supplying water to a coolant flow path defined by the fuel cell stack;

cooling the two or more of a reaction cell with the water flowing in the coolant flow path;

contacting the passive water management membrane with the water used in the step of cooling and/or exhaust water from the two or more of a reaction cell; and humidifying the hydrogen feed stream via back diffusion through the passive water management membrane.

* * * * *